US012581370B2

(12) United States Patent
Takeda et al.

(10) Patent No.: US 12,581,370 B2
(45) Date of Patent: Mar. 17, 2026

(54) BASE STATION APPARATUS, TERMINAL APPARATUS, CONTROL METHOD, AND COMPUTER-READABLE STORAGE MEDIUM THAT IMPROVE PROCESSING FOR CHANGING CONNECTION DESTINATION

(71) Applicant: KDDI CORPORATION, Tokyo (JP)

(72) Inventors: Hiroki Takeda, Tokyo (JP); Yanwei Li, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 304 days.

(21) Appl. No.: 18/515,822

(22) Filed: Nov. 21, 2023

(65) Prior Publication Data

US 2024/0089807 A1 Mar. 14, 2024

Related U.S. Application Data

(63) Continuation of application No. PCT/JP2022/020828, filed on May 19, 2022.

(30) Foreign Application Priority Data

May 28, 2021 (JP) ................................. 2021-090223
Apr. 21, 2022 (JP) ................................. 2022-070258

(51) Int. Cl.
*H04W 8/22* (2009.01)
*H04W 36/00* (2009.01)
(Continued)

(52) U.S. Cl.
CPC ......... *H04W 36/0055* (2013.01); *H04W 8/22* (2013.01); *H04W 36/00692* (2023.05); *H04W 36/362* (2023.05); *H04W 84/02* (2013.01);

*H04W 88/02* (2013.01); *H04W 88/08* (2013.01); *H04W 92/02* (2013.01); *H04W 92/10* (2013.01); *H04W 92/20* (2013.01)

(58) Field of Classification Search
CPC ..... H04W 8/22–245; H04W 24/02–10; H04W 36/00–385; H04W 48/02–20; H04W 72/02–569; H04W 76/10–50; H04W 84/02–16; H04W 88/02–12; H04W 92/02–24; Y02D 30/70
See application file for complete search history.

(56) References Cited

FOREIGN PATENT DOCUMENTS

EP          3 780 742 A1      2/2021
KR      1020210020267 A      2/2021
WO      WO-2020/145778 A1      7/2020

OTHER PUBLICATIONS

3GPP®, "3GPP TR 38.874 V16.0.0 (Dec. 2018)", 3rd Generation Partnership Project; Technical Specification Group Radio Access Network; NR; Study on Integrated Access and Backhaul; (Release 16), Dec. 2018, pp. 1-111 (111 pages).
(Continued)

*Primary Examiner* — Timothy J Weidner
(74) *Attorney, Agent, or Firm* — Foley & Lardner LLP

(57) ABSTRACT

A base station apparatus notifies a terminal apparatus of whether to delete setting information related to a first another base station apparatus when the terminal apparatus has connected to a second another base station apparatus different from the first another base station apparatus due to a handover or a change or addition of a secondary cell, in a case where the terminal apparatus holds the setting information related to the first another base station apparatus.

22 Claims, 7 Drawing Sheets

(51) Int. Cl.

| | |
|---|---|
| *H04W 36/36* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |
| *H04W 92/20* | (2009.01) |

(56) References Cited

OTHER PUBLICATIONS

Apple Inc: "Consecutive Conditional Handover," 3GPP Draft; R2-1914513, 3rd Generation Partnership Project (3GPP), Mobile Competence Centre, 650, Route Des Lucioles, F-06921 Sophia-Antipolis Cedex, France, Nov. 8, 2019, vol. RAN WG2, No. Reno, USA Nov. 18, 2019-Nov. 22, 2019. Retrieved from the Internet: URL:https://ftp.3gpp.org/tsg_ran/WG2_RL2/T SGR2_108/Docs/R2-1914513.zip R2-1914513 Consecutive CHO—final.docx [retrieved on Nov. 8, 2019] * Section 1 and 2.2 *.

Apple: "Details of conditional handover," 1,5-9, 3GPP Draft; R2-1901840_Details of 14,21,22 Conditional Handover_VI, 3rd Generation Partnership Project (3GPP), Mobile Competence Centre, 650, Route Des Lucioles, F-06921 Sophia-Antipolis Cedex, France, Feb. 15, 2019, vol. RAN WG2, No. Athens, Greece, Feb. 25, 2019-Mar. 1, 2019. Retrieved from the Internet: URL:http://www.3gpp.org/ftp/tsg%5Fran/WG2%5FRL2/TSGR2%5F105/Docs/R2%2D1901840%2Ezip [retrieved on Feb. 15, 2019]* Section 2.1 *.

European search report dated Aug. 26, 2024, concerning the corresponding European Patent Application No. 22811242.1 (14 pages).

F I G. 3
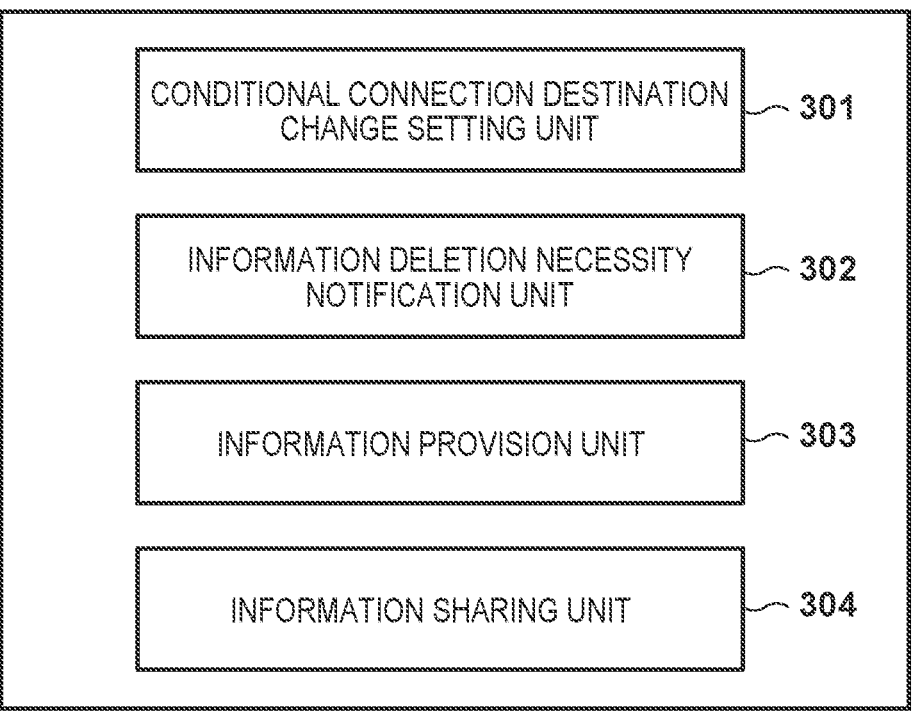
CONDITIONAL CONNECTION DESTINATION CHANGE SETTING UNIT — 301
INFORMATION DELETION NECESSITY NOTIFICATION UNIT — 302
INFORMATION PROVISION UNIT — 303
INFORMATION SHARING UNIT — 304
F I G. 4
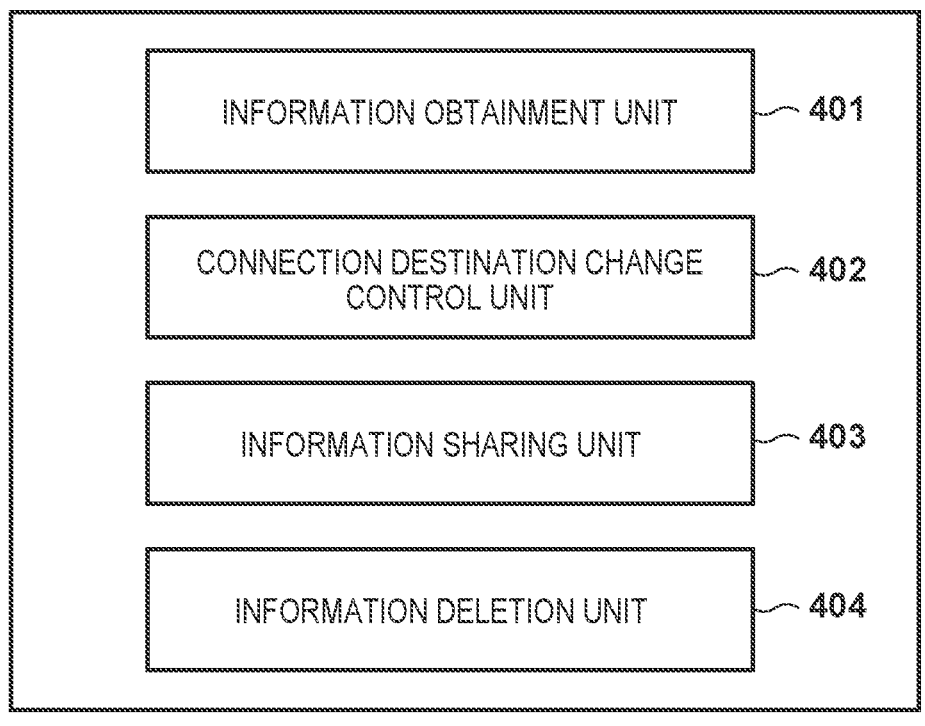
INFORMATION OBTAINMENT UNIT — 401
CONNECTION DESTINATION CHANGE CONTROL UNIT — 402
INFORMATION SHARING UNIT — 403
INFORMATION DELETION UNIT — 404

F I G. 5
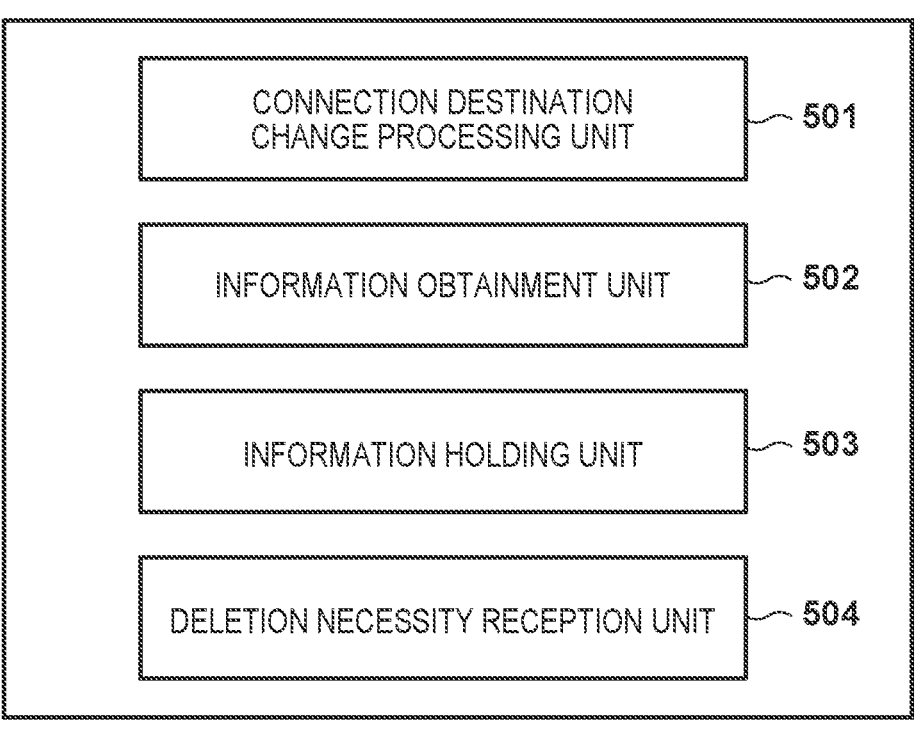

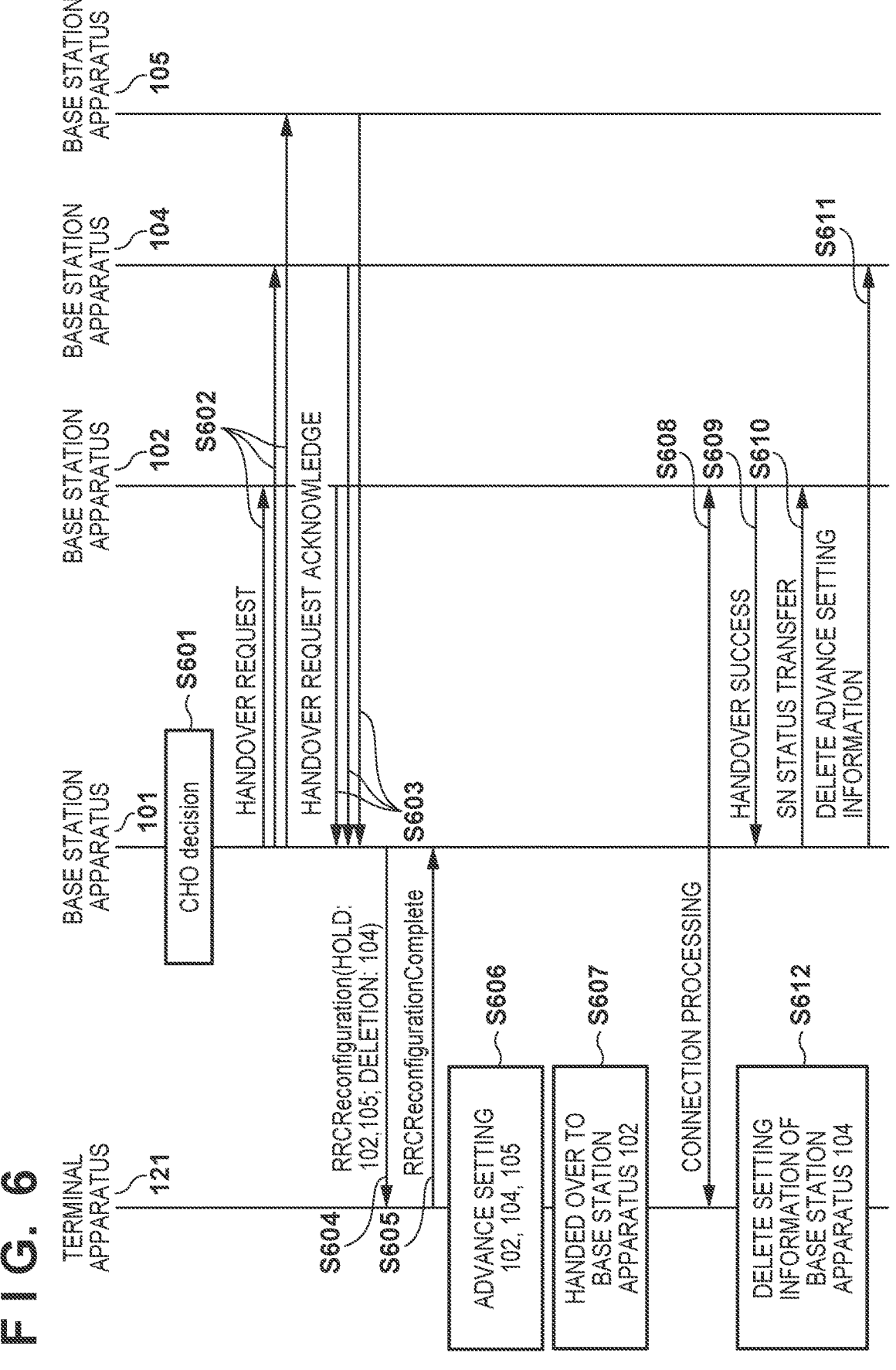
F I G. 6

FIG. 7

BASE STATION APPARATUS, TERMINAL APPARATUS, CONTROL METHOD, AND COMPUTER-READABLE STORAGE MEDIUM THAT IMPROVE PROCESSING FOR CHANGING CONNECTION DESTINATION

CROSS-REFERENCE TO RELATED APPLICATION(S)

This application is a continuation of International Patent Application No. PCT/JP2022/020828 filed on May 19, 2022, which claims priority to and the benefit of Japanese Patent Application No. 2021-090223 filed on May 28, 2021, and Japanese Patent Application No. 2022-070258 filed on Apr. 21, 2022, the entire disclosures of which are incorporated herein by reference.

BACKGROUND OF THE INVENTION

Field of the Invention

The present invention relates to a technique to improve processing for changing a connection destination.

Description of the Related Art

In a cellular communication system, a handover technique that switches between connection destinations of a terminal apparatus in accordance with, for example, a movement of the terminal apparatus is used in order to secure continuity of communication. In a standard method for a handover, after deterioration in the communication quality of a radio link to which a terminal apparatus is currently connected, processing for a preparation for a handover and the like is started on a core network side, and an instruction message is transmitted from a base station apparatus to the terminal apparatus. However, according to this method, processing between the actual deterioration in the communication quality and transmission of a handover instruction takes time; this might extend a time period in which communication cannot be performed or the communication quality is insufficient. In view of this, a method has been defined that executes the foregoing processing for the preparation and the like in advance, and switches between connection-destination cells without receiving an instruction message from a base station apparatus in a case where a terminal apparatus has satisfied predetermined conditions (see 3GPP® TR38.874, V16.0.0, December 2018). The predetermined conditions include, for example, a case where the radio quality of a neighboring cell has become more favorable than the radio quality of a cell to which the terminal apparatus is currently connected by a predetermined level or more, and a case where the radio quality of the cell to which the terminal apparatus is currently connected has become equal to or lower than a predetermined value. According to this method, as the preparation for the handover is completed on a core network side before the occurrence of, for example, a reduction in the communication quality with which the handover is supposed to be executed, a time period in which communication cannot be performed or the communication quality is insufficient can be significantly reduced. Such a handover is called a conditional handover. Note that, for example, in multi-connectivity (MC) where a terminal apparatus connects to a plurality of cells, the processing for the preparation and the like can be executed in advance, and the terminal apparatus can add or change a secondary cell without receiving an instruction message from a base station apparatus in a case where the terminal apparatus has satisfied predetermined conditions in a similar way.

In a conditional handover and the addition or change of a secondary cell, setting information that has been set in advance on a terminal apparatus is deleted after connecting to a post-change connection destination. Therefore, in an environment where switching between connection-destination cells occurs frequently, such as an environment where small cells are used, setting information is deleted and a new advance setting is configured on each occasion; this is not efficient.

SUMMARY OF THE INVENTION

The present invention provides a technique to improve the efficiency of switching of a cell to which a terminal apparatus is connected.

A base station apparatus according to one aspect of the present invention comprises one or more processors; and one or more memories that store a computer-readable instruction for causing, when executed by the one or more processors, the one or more processors to: perform notification to a terminal apparatus of whether to delete setting information related to a first another base station apparatus when the terminal apparatus has connected to a second another base station apparatus different from the first another base station apparatus due to a handover or a change or addition of a secondary cell, in a case where the terminal apparatus holds the setting information related to the first another base station apparatus, the setting information including a condition at the time of connection of the terminal apparatus to the first another base station apparatus due to a handover or a change or addition of a secondary cell, and a communication parameter for a case where the terminal apparatus has connected to the first another base station apparatus, the first another base station apparatus providing a cell that acts as a handover target candidate set in advance on the terminal apparatus currently connected to the base station apparatus, or providing a cell that acts as a candidate for a target of addition or change of a secondary cell set in advance on the terminal apparatus currently connected to a cell provided by the base station apparatus as a primary cell.

A terminal apparatus according to one aspect of the present invention comprises a terminal apparatus capable of connecting to a first base station apparatus that provides a primary cell and to a second base station apparatus that provides a secondary cell in parallel, the terminal apparatus comprising: one or more processors; and one or more memories that store a computer-readable instruction for causing, when executed by the one or more processors, the one or more processors to: hold setting information related to a first another base station apparatus that provides a cell that acts as a candidate for a target of change as the secondary cell, or a candidate to be added as the secondary cell, in a case where the secondary cell is to be changed or the secondary cell is to be added when currently connected to the second base station apparatus, the setting information including a condition at the time of connection of the terminal apparatus to the first another base station apparatus, and a communication parameter for a case where the terminal apparatus has connected to the first another base station apparatus; and receive, from the first base station apparatus, a notification indicating whether the setting information related to the first another base station apparatus is to be deleted in a case where the terminal apparatus has connected to a second another base station apparatus different from the first another base station apparatus and added a cell provided by the second another base station apparatus as the secondary cell, or in a case where the terminal apparatus has changed the secondary cell from another cell, wherein the terminal apparatus holds, rather than deleting, the setting information related to the first another base station apparatus when having connected to the second another base station apparatus, without connecting to the first another base station apparatus, due to an addition or change of the secondary cell in a state where the notification indicates that the setting information related to the first another base station apparatus is not to be deleted, and deletes the setting information related to the first another base station apparatus when having connected to the second another base station apparatus, without connecting to the first another base station apparatus, due to an addition or change of the secondary cell in a state where the notification indicates that the setting information related to the first another base station apparatus is to be deleted.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a diagram showing an exemplary functional configuration of a handover-source base station apparatus.

FIG. 4 is a diagram showing an exemplary functional configuration of a handover-target base station apparatus.

FIG. 5 is a diagram showing an exemplary functional configuration of a terminal apparatus.

FIG. 6 is a diagram showing an example of a flow of processing executed in the radio communication system.

FIG. 7 is a diagram showing an example of a flow of processing executed in the radio communication system.

DESCRIPTION OF THE EMBODIMENTS

Figure 1:
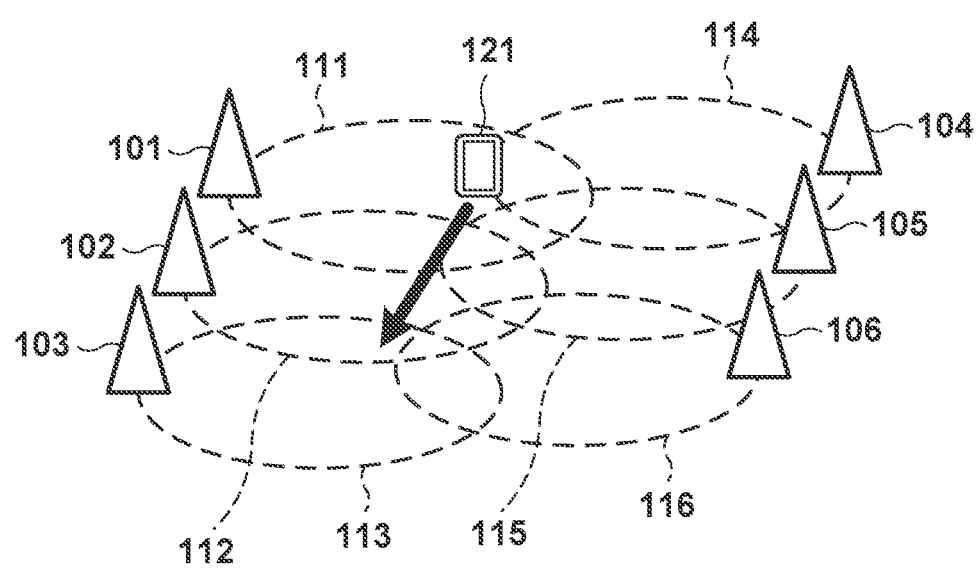
FIG. 1 is a diagram showing an exemplary configuration of a radio communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(System Configuration)

FIG. 1 shows an exemplary configuration of a radio communication system of the present embodiment. The present radio communication system is a system in which a plurality of base station apparatuses 101 to 106 compose cells 111 to 116, respectively, and a terminal apparatus 121 moves across these cells. The base station apparatuses 101 to 106 and the terminal apparatus 121 are configured to operate in conformity with, for example, the long-term evolution (LTE) standard or the fifth-generation (5G) New Radio (NR) standard. Note that the foregoing is an example; the following discussion can apply to any system in which the terminal apparatus 121, when in motion, performs communication while switching between connection-destination base station apparatuses through a handover. In the present embodiment, it is assumed that the terminal apparatus 121 is currently connected to the base station apparatus 101, and thereafter switches between connection-destination base station apparatuses through the execution of handover processing when it has moved to the inside of the range of, for example, the cell 112.

In the present embodiment, an advance setting for a handover of the terminal apparatus 121 is configured, for example, when the terminal apparatus 121 has established connection to one of the base station apparatuses, or when the radio quality related to the base station apparatus 101 to which it is currently connected has deteriorated by a certain degree. Here, a state where the advance setting has been configured is a state where setting of parameters and the like for a case where the terminal apparatus 121 is to connect to a handover target candidate has been completed, but the terminal apparatus 121 has not actually switched between connection-destination base station apparatuses. The advance setting includes conditions under which the handover is to be actually performed; in a case where the terminal apparatus 121 has determined that the conditions have been satisfied, it disconnects connection to a base station apparatus to which it is currently connected, and attempts to connect to a base station apparatus that acts as a new connection destination by establishing synchronization therewith. A handover that autonomously switches between connection destinations when the terminal apparatus 121 has determined that the conditions have been satisfied with use of the foregoing advance setting is called a conditional handover.

In a case where a conditional handover is performed, a base station apparatus that is currently connected transmits a handover request message (HANDOVER REQUEST) including, for example, information of parameters that are currently used by the terminal apparatus 121 to another base station apparatus that acts as a handover target candidate. Then, the base station apparatus that acts as the handover target candidate includes information of, for example, parameters to be used in a case where the terminal apparatus 121 has been handed over into a response message to the foregoing message (HANDOVER REQUEST ACKNOWLEDGE), and transmits the response message to the base station apparatus to which the terminal apparatus 121 is currently connected. Here, the base station apparatus that acts as the handover target candidate holds the transmitted information of the parameters and the like as advance setting information. Furthermore, the base station apparatus that is currently connected, or the base station apparatus that acts the handover target candidate, determines conditions to be satisfied at the time of the handover to this base station apparatus that acts as the handover target candidate. Then, the base station apparatus that is currently connected notifies the terminal apparatus 121 of advance setting information that includes information of parameters to be used in a case where the handover to the base station apparatus that acts as the handover target candidate has been performed, as well as handover conditions. This notification can be provided using, for example, a radio resource control (RRC) message. In one example, the terminal apparatus 121 is notified of the advance setting information via an RRCReconfiguration message.

Upon receiving this advance setting information, the terminal apparatus 121 holds this advance setting information, and starts monitoring whether the handover conditions have been satisfied; in a case where the conditions have been satisfied, it executes processing for disconnection of connection to the base station apparatus that is currently connected, establishment of synchronization with the handover-target base station apparatus, and so forth, in order to actually switch between connection destinations. Note that there can be a plurality of base station apparatuses that act as handover target candidates. For this reason, advance setting information is set separately for each of one or more base station apparatuses that act as handover target candidates; therefore, pieces of advance setting information corresponding to the respective base station apparatuses can include pieces of handover identification information that identify the respective pieces of advance setting information. Furthermore, as one base station apparatus can compose a plurality of cells, pieces of advance setting information can be set separately for these plurality of cells. The terminal apparatus 121 monitors whether conditions under which a handover is to be executed have been satisfied in correspondence with each of the plurality of pieces of advance setting information, enables the piece of advance setting information including the satisfied conditions, and executes a handover. The terminal apparatus 121 can complete a conditional handover in the foregoing manner, and accordingly performs communication using communication parameters related to the base station apparatus (cell) that acts as a post-handover connection destination.

In addition, the terminal apparatus 121 deletes, among the pieces of advance setting information, pieces of advance setting information that have not been used (i.e., pieces of advance setting information related to base station apparatuses that have not been selected as a handover target). Furthermore, the handover-source base station apparatus instructs other base station apparatuses which act as handover target candidates, and which have not been selected as the handover target, to delete pieces of advance setting information for the handover of the terminal apparatus 121. As a result, the pieces of advance setting information are deleted after completion of the conditional handover.

Meanwhile, for example, in a case where the terminal apparatus 121 is moving at high speed, or in a case where the cells 111 to 116 are small cells, it is expected that the handover of the terminal apparatus 121 be performed frequently. In this case, generation and deletion of advance setting information are repeated frequently; this is not efficient. For this reason, in the present embodiment, the terminal apparatus 121 is allowed to continually use advance setting information. That is to say, after completion of a conditional handover, the terminal apparatus 121 holds pieces of advance setting information related to base station apparatuses which act as handover target candidates and which have not been selected, without deleting them. Note that although the following description will be provided using such terms as "advance setting information related to a base station apparatus", this "base station apparatus" may be replaced with a "cell". For example, in a case where one base station apparatus provides a plurality of cells, pieces of advance setting information may be prepared in relation to these plurality of cells, respectively, and advance setting information may be held or deleted on a per-cell basis.

In the present embodiment, for example, a base station apparatus that is currently connected to the terminal apparatus 121 can notify the terminal apparatus 121 of whether to hold or delete pieces of advance setting information that respectively correspond to one or more first another base station apparatuses (cells) that act as candidates for a target of a handover from this base station apparatus when handed over to an apparatus different from these first another base station apparatuses that act as the candidates. Note that this base station apparatus can also provide a notification indicating, for example, whether to keep holding or delete advance setting information which has been set in advance by another base station apparatus that was connected to the terminal apparatus 121 before, and which has been held without being deleted after one or more handovers have been performed. Note that the base station apparatus may execute an advance setting for a conditional handover with respect to a first another base station apparatus for which the terminal apparatus 121 does not hold corresponding advance setting information, and cause the terminal apparatus 121 to hold this advance setting information. At this time, with regard to this advance setting information related to the first another base station apparatus that is to be newly held, the base station apparatus can notify the terminal apparatus 121 of whether to hold the advance setting information even after a handover to a second another base station apparatus different from the first another base station apparatus.

The terminal apparatus 121 keeps holding advance setting information that has been held since before connection to a base station apparatus that is currently connected, as well as advance setting information that has been set in advance by the base station apparatus that is currently connected, at least until the execution of a handover from the base station apparatus that is currently connected. Note that a valid period may be provided for advance setting information; in this case, the terminal apparatus 121 may delete this advance setting information along with expiration of the valid period, even in a state where a handover has not been actually performed. Then, among pieces of advance setting information that have been set in advance respectively for one or more first another base station apparatuses (cells) that act as candidates for a destination of a handover from the base station apparatus that is currently connected, pieces of advance setting information that are not to be deleted according to the notification are continuously held in the terminal apparatus 121 without being deleted, even after the execution of a handover to a second base station apparatus different from these first another base station apparatuses. On the other hand, among the pieces of advance setting information of the first another base station apparatuses, pieces of advance setting information that are to be deleted according to the notification are deleted by the terminal apparatus 121 in a case where a handover to a second another base station apparatus different from these first another base station apparatuses has been performed.

For example, with respect to the terminal apparatus 121 that is currently connected, the base station apparatus 101 executes an advance setting for a handover of the terminal apparatus 121 in connection with the base station apparatus 102, the base station apparatus 104, and the base station apparatus 105 as handover target candidates. Then, the base station apparatus 101 notifies the terminal apparatus 121 of whether to delete pieces of advance setting information that respectively correspond to the base station apparatus 102, the base station apparatus 104, and the base station apparatus

105 in a case where the terminal apparatus 121 has been handed over to another base station apparatus. For example, the base station apparatus 101 can provide the terminal apparatus 121 with a notification indicating that the pieces of advance setting information of the base station apparatus 102 and the base station apparatus 105 are to be held, whereas the piece of advance setting information of the base station apparatus 104 is to be deleted. At this time, in a case where the terminal apparatus 121 has been handed over to the cell 114 of the base station apparatus 104, the terminal apparatus 121 connects to the base station apparatus 104 using the piece of advance setting information of the base station apparatus 104 in a conventional way. Then, the terminal apparatus 121 keeps holding the pieces of advance setting information of the base station apparatus 102 and the base station apparatus 105 without deleting them. On the other hand, in a case where the terminal apparatus 121 has been handed over to the cell 112 of the base station apparatus 102, the terminal apparatus 121 connects to the base station apparatus 102 using the piece of advance setting information of the base station apparatus 102 in a conventional way. Then, the terminal apparatus 121 deletes the piece of advance setting information of the base station apparatus 104, and keeps holding the piece of advance setting information of the base station apparatus 105 without deleting the same. Note that in a case where the terminal apparatus 121 has been handed over to the base station apparatus 102, the base station apparatus 102 can, for example, newly consider the base station apparatus 101, the base station apparatus 103, and the base station apparatus 106 as base station apparatuses that act as handover target candidates, and execute an advance setting for a handover to these base station apparatuses with respect to the terminal apparatus 121. The terminal apparatus 121 can keep holding pieces of advance setting information in a necessary range in the foregoing manner; as a result, immediately after a handover, a handover can be executed again without configuring an advance setting repeatedly.

Note that the base station apparatus that is currently connected to the terminal apparatus 121 may, after a handover, provide the terminal apparatus 121 with an instruction regarding pieces of advance setting information to be deleted, and provide the terminal apparatus 121 with an instruction regarding pieces of advance setting information to be held without being deleted, among pieces of advance setting information related to other base station apparatuses different from a handover-target base station apparatus. Also, in a case where the terminal apparatus 121 holds pieces of advance setting information of a plurality of base station apparatuses, the base station apparatus can notify the terminal apparatus 121 of whether to hold or delete these pieces of advance setting information on an individual basis. Furthermore, the base station apparatus may notify the terminal apparatus 121 of whether to hold or delete a plurality of pieces of advance setting information in a batch. In addition, it may issue an instruction regarding a setting whereby holding and deleting operations are switched in accordance with a base station apparatus with which handover processing is executed. For example, with regard to holding of the piece of advance setting information of the base station apparatus 104, it is possible to provide a notification indicating that the piece of advance setting information is held in a case where a handover to the base station apparatus 102 is executed, and deleted in a case where a handover to the base station apparatus 105 is executed, for instance.

Note that when the base station apparatus provides a notification indicating whether each of one or more pieces of advance setting information held by the terminal apparatus 121 is to be held or deleted, it may use pieces of identification information that are respectively allocated to these pieces of advance setting information. For example, the base station apparatus can notify the terminal apparatus 121 of identification information corresponding to advance setting information that is to be deleted after a handover. Also, the base station apparatus may notify the terminal apparatus 121 of identification information corresponding to advance setting information that is not to be deleted (that is to be continuously held) after a handover. Note that an identifier of a cell corresponding to advance setting information (a physical cell identifier), or a value corresponding to this identifier of the cell, can be used as identification information of this advance setting information. The value corresponding to the identifier of the cell is, for example, CondReconfigId or the like, and can be a value that is calculated as a result of a computational operation whereby the identifier of the cell is input to a predetermined function as an argument. The predetermined function is, for example, a modulo operation function, and can be a function that maps the identifier of the cell in a predetermined numerical range. In this case, the base station apparatus can use the identifier of the cell to provide a notification indicating whether to keep holding or delete advance setting information corresponding to this cell. For example, the base station apparatus can notify the terminal apparatus 121 of a list of identifiers of cells corresponding to pieces of advance setting information that are to be deleted, and a list of identifiers of cells corresponding to pieces of advance setting information that are not to be deleted.

Furthermore, the base station apparatus may adjust advance setting information so that identification information corresponding to advance setting information that is to be held has a value in a predetermined range. After a handover, the terminal apparatus 121 can hold advance setting information corresponding to identification information that has a value in the predetermined range, and delete advance setting information corresponding to identification information that has a value other than such a value. In this case, the base station apparatus can provide a notification indicating whether to delete each piece of advance setting information by notifying the terminal apparatus 121 of information indicating the predetermined range. Also, the predetermined range may be fixed; in this case, the base station apparatus may not explicitly provide a notification indicating advance setting information that is to be held or deleted. When executing an advance setting for a handover, the base station apparatus sets advance setting information that is not to be deleted so that the value of corresponding identification information is included in the predetermined range. Similarly, when executing an advance setting for a handover, the base station apparatus sets advance setting information that is to be deleted so that the value of corresponding identification information is not included in the predetermined range. In addition, in a case where the value of identification information of advance setting information which has been held in the terminal apparatus 121 since before a handover to the base station apparatus and which is to be deleted is included in the predetermined range, the base station apparatus can re-set the value of this identification information of the advance setting information by changing the value so that the value is outside the predetermined range. In the foregoing manner, with use of the value of identification information of advance setting information, it is possible to implicitly indicate whether this advance setting information is to be deleted by the terminal apparatus 121 after a handover. In this way, the terminal apparatus 121 can be notified of whether advance setting information is to be deleted or held, without the base station apparatus performing explicit signaling.

Note that the handover-source base station apparatus provides the handover-target base station apparatus with a notification indicating that the terminal apparatus 121 holds advance setting information. With this information, the handover-target base station apparatus need not re-set the advance setting information that is already held by the terminal apparatus 121. Note that in a case where the advance setting information should be changed, the handover-target base station apparatus may execute a procedure for changing an advance setting. The handover-source base station apparatus notifies the handover-target base station apparatus of, for example, identification information associated with the advance setting information. In one example, when configuring an advance setting, the handover-source base station apparatus can share advance setting information to be set in advance on the terminal apparatus with each of the base station apparatuses that act as handover target candidates. For example, in FIG. 1, in a case where the base station apparatus 101 regards the base station apparatus 102, the base station apparatus 104, and the base station apparatus 105 as handover target candidates and configures, on the terminal apparatus 121, an advance setting for the execution of handovers to these respective base station apparatuses, pieces of advance setting information can be shared among the base station apparatus 101, the base station apparatus 102, the base station apparatus 104, and the base station apparatus 105. That is to say, the base station apparatus 101 can be configured to transmit a handover request to each of the base station apparatus 102, the base station apparatus 104, and the base station apparatus 105, obtain pieces of advance setting information related to these base station apparatuses, and notify these base station apparatuses of the obtained pieces of advance setting information. In this case, for example, in the base station apparatus 102, pieces of advance setting information of the base station apparatus 104 and the base station apparatus 105 have been held since before the handover of the terminal apparatus 121. It is assumed here that, in a case where the terminal apparatus 121 has been handed over to the base station apparatus 102, the terminal apparatus 121 deletes the piece of advance setting information of the base station apparatus 104, and keeps holding the piece of advance setting information of the base station apparatus 105. In this case, the handover-source base station apparatus 101 can notify the base station apparatus 102 of, for example, a piece of identification information corresponding to the piece of advance setting information of the base station apparatus 104. Base on this notification, the base station apparatus 102 can determine that the piece of advance setting information of the base station apparatus 104 is to be deleted, and delete this piece of information. On the other hand, the base station apparatus 102 keeps holding the piece of advance setting information of the base station apparatus 105 without deleting the same because it has not been notified of a corresponding piece of identification information. Note that it is possible to provide a notification indicating identification information corresponding to advance setting information to be deleted, or to provide a notification indicating identification information corresponding to advance setting information to be continuously held.

Furthermore, the base station apparatus that acts as a handover target candidate may not hold advance setting information of another base station apparatus that acts as a candidate before a handover is performed. In this case, when a handover has been performed, the handover-source base station apparatus may notify the handover-target base station apparatus of advance setting information that is continuously held in the terminal apparatus 121. For example, assume that the terminal apparatus 121 deletes advance setting information of the base station apparatus 104, but keeps holding advance setting information of the base station apparatus 105. In this case, when the terminal apparatus 121 has been handed over to the base station apparatus 102, the base station apparatus 101 can notify the base station apparatus 102 of the advance setting information of the base station apparatus 105. Note that the base station apparatus 101 does not notify the base station apparatus 102 of the advance setting information of the base station apparatus 104. This is because, when the terminal apparatus 121 has been handed over to the base station apparatus 102, the advance setting information of the base station apparatus 104 is deleted in the terminal apparatus 121.

Furthermore, the handover-source base station apparatus may provide a notification indicating, out of advance setting information to be continuously held, only one of conditions under which a handover is to be executed and communication parameters. In this case, with regard to conditions under which a handover is to be executed or communication parameters that have not been obtained, the handover-target base station apparatus may re-set the same, or may obtain the same from the base station apparatus that acts as a handover target candidate corresponding to this advance setting information. Also, the handover-source base station apparatus may notify the handover-target base station apparatus of the aforementioned identification information and at least one of the conditions for the execution of the handover and the communication parameters, as well all information indicating a cell for which these pieces of information are intended in connection with the handover. This information can be, for example, identification information that can identify a cell or a frequency, such as a physical cell identifier (PCI) and an absolute radio-frequency channel number (ARFCN-ValueNR). Note that although these pieces of information can be included in communication parameters of advance setting information, providing a notification indicating these pieces of information separately allows the handover-target base station apparatus to acknowledge a cell or a frequency to which this advance setting information is related without analyzing communication parameters in the advance setting information. Note that transmission of information from the handover-source base station apparatus to the handover-target base station apparatus can be performed in line with transfer of a state of a sequence number by the handover-source base station apparatus when, for example, the handover-target base station apparatus has provided the handover-source base station apparatus with a notification indicating that the handover of the terminal apparatus 121 has been successful.

As stated earlier, the handover-target base station apparatus obtains, from the handover-source base station apparatus, predetermine information such as at least one of handover conditions, communication parameters, and pieces of identification information corresponding to combinations of handover conditions and communication parameters, in connection with pieces of advance setting information that are to be held after a handover from the handover-source base station apparatus among pieces of advance setting information that have been set in advance on the terminal apparatus 121 with respect to one or more base station apparatuses that act as handover target candidates. Then, based on this predetermined information that has been obtained, the handover-target base station apparatus controls a subsequent handover of the terminal apparatus 121 to still another base station apparatus.

Note that when the terminal apparatus 121 has established connection in a predetermined area (has performed initial connection, or has been handed over), the base station apparatus that is currently connected can configure, on the terminal apparatus 121, an advance setting including conditions that are to be satisfied when the terminal apparatus 121 is handed over to each of the plurality of base station apparatuses that belong to this predetermined area, and settings of communication parameters to be used after the handover. Then, the base station apparatus to which the terminal apparatus 121 is currently connected shares such advance setting information that has been set in advance with other base station apparatuses inside the predetermined area. Note that the base station apparatus to which the terminal apparatus 121 is currently connected also configures an advance setting for the execution of a handover from another base station apparatus to itself, and can share this advance setting information with other base station apparatuses inside the predetermined area. Then, the base station apparatuses inside the predetermined area can delete such advance setting information when the terminal apparatus 121 has been handed over to the outside of this predetermined area. In this way, after the terminal apparatus 121 has established connection inside the predetermined area, it can execute a conditional handover on a continual basis inside this predetermined area.

For example, assume that the cell 111, the cell 112, the cell 114, and the cell 115 form a predetermined area, and the terminal apparatus 121 has established connection to the base station apparatus 101. At this time, for example, when the terminal apparatus 121 has established connection, or when there has been an attempt for a handover from the base station apparatus 101, the base station apparatus 101 executes an advance setting for a handover inside the predetermined area. For example, the base station apparatus 101 transmits a handover request message to the base station apparatus 102, the base station apparatus 104, and the base station apparatus 105, and obtains information of communication parameters after the handover and the like. Also, the base station apparatus 101 or a base station apparatus that acts as a handover target candidate determines handover conditions. Furthermore, the base station apparatus 101 allocates pieces of identification information corresponding to combinations of handover conditions and communication parameters (pieces of advance setting information). Note that the base station apparatus 101 may set the pieces of identification information in advance, and transmit the handover request message after including these pieces of identification information therein. Then, the base station apparatus 101 transmits the obtained pieces of advance setting information and identification information to the base station apparatus 102, the base station apparatus 104, and the base station apparatus 105 that act as the handover target candidates. Also, the base station apparatus 101 can additionally transmit pieces of advance setting information and identification information for the execution of a handover from one of the base station apparatus 102, the base station apparatus 104, and the base station apparatus 105 to itself. In this way, for example, the base station apparatus 101 holds pieces of advance setting information for the base station apparatus 102, the base station apparatus 104, and the base station apparatus 105. Also, the base station apparatus 102 holds pieces of advance setting information for the base station apparatus 101, the base station apparatus 104, and the base station apparatus 105. Furthermore, the base station apparatus 104 holds pieces of advance setting information for the base station apparatus 101, the base station apparatus 102, and the base station apparatus 105; also, the base station apparatus 105 holds pieces of advance setting information for the base station apparatus 101, the base station apparatus 102, and the base station apparatus 104. In addition, the base station apparatus 101 notifies the terminal apparatus 121 of these pieces of advance setting information as well. Note that in a case where a handover to a base station apparatus outside the predetermined area has been performed, the terminal apparatus 121 can be notified of information indicating that these pieces of advance setting information are to be deleted. For example, identification information indicating a predetermined area is added to advance setting information; in a case where the terminal apparatus 121 is to be handed over to a base station apparatus that belongs to an area with identification information different from identification information of an area to which the currently-connected base station apparatus belongs, the terminal apparatus 121 can delete advance setting information to which the identification information of the area that the pre-handover base station apparatus belongs to has been added.

For example, in a case where the terminal apparatus 121 has been explicitly notified of deletion of advance setting information from the base station apparatus that is currently connected thereto, or when the valid period has elapsed, it can delete this advance setting information; however, it does not delete this advance setting information in the case of a handover inside a predetermined area. On the other hand, for example, in a case where the terminal apparatus 121 has moved beyond the predetermined area and has been handed over to another base station apparatus that does not belong to this predetermined area, it deletes pieces of advance setting information for base station apparatuses that belong to this predetermined area. Also, the base station apparatus that was connected to the terminal apparatus 121 inside the predetermined area immediately before the terminal apparatus 121 was handed over to an apparatus outside the predetermined area can instruct each of the base station apparatuses inside the predetermined area to delete pieces of advance setting information when the handover has succeeded (or when connection to this base station apparatus has been disconnected). For example, when the terminal apparatus 121 has been handed over from the base station apparatus 102 to the base station apparatus 103, the base station apparatus 102 can provide the base station apparatus 101, the base station apparatus 104, and the base station apparatus 105 with a notification for deletion of pieces of advance setting information that have been shared among the base station apparatus 101, the base station apparatus 102, the base station apparatus 104, and the base station apparatus 105.

Note that in a case where handover conditions and communication parameters are to be changed, this change may be made in the entirety of the predetermined area, or this change may be made only in a part of the base station apparatuses. Note that although the predetermined area can be an area corresponding to, for example, the same tracking area identifier (TAI), the same tracking area code (TAC), or the same system information area identifier, another area (e.g., an area specific to the terminal apparatus 121) may be defined thereas. Also, the predetermined area may be dynamically set; for example, when the terminal apparatus 121 has been handed over from the base station apparatus 101 to the base station apparatus 102, the cell 113 and the cell 116 may be added to the predetermined area that includes only the cell 111, the cell 112, the cell 114, and the cell 115. In this case, the base station apparatus 102 executes processing for, for example, transmission of a handover request message to the base station apparatus 103 and the base station apparatus 106, shares pieces of advance setting information with each base station apparatus inside the predetermined area, and also notifies the terminal apparatus 121 of these pieces of advance setting information. Moreover, for example, when the terminal apparatus 121 has been handed over from the base station apparatus 102 to the base station apparatus 103, the cell 111 and the cell 114 may be deleted from the predetermined area. In this case, when this handover has been performed, the base station apparatus 103 can instruct the base station apparatus 101 and the base station apparatus 104 to delete all pieces of advance setting information for the terminal apparatus 121, and instruct the base station apparatus 102, the base station apparatus 105, and the base station apparatus 106 to delete pieces of advance setting information for the base station apparatus 101 and the base station apparatus 104. In addition, even in a case where the predetermined area is defined in advance, one cell may be included in a plurality of predetermined areas. In this case, when the terminal apparatus 121 has connected to a base station apparatus that provides this cell, an advance setting for the plurality of predetermined areas that include this cell can be configured. In this way, the predetermined area(s) can be appropriately formed in accordance with the position of the terminal apparatus 121, and advance setting information for a conditional handover can be appropriately prepared.

Note that when the terminal apparatus 121 has been placed in an unconnected state after terminating communication and disconnecting connection, various types of information, such as pieces of advance setting information related to the terminal apparatus 121 that are held in the base station apparatus 101 to the base station apparatus 106 and the terminal apparatus 121 in the above-described manner, can be deleted.

Although the foregoing has described processing for a case where the terminal apparatus 121 executes a conditional handover, a similar method can be applied also to, for example, an addition and change of a secondary cell for a case where the terminal apparatus 121 uses multi-connectivity (MC) or carrier aggregation (CA). That is to say, when autonomously adding or changing a secondary cell upon determining that conditions have been satisfied using an advance setting, the terminal apparatus 121 normally deletes pieces of advance setting information related to base station apparatuses which provide secondary cell candidates and which have not been selected as a connection destination. In contrast, the present embodiment enables the terminal apparatus 121 to hold these pieces of advance setting information without deleting them. Furthermore, the terminal apparatus 121 deletes pieces of advance setting information related to base station apparatuses that provide secondary cell candidates also in a case where a primary cell has been changed (i.e., a handover has been performed). In contrast, in the present embodiment, the terminal apparatus 121 can hold pieces of advance setting information related to secondary cell candidates without deleting them also in a case where a handover has been performed in relation to a primary cell.

Note that processing related to deletion of advance setting information can be executed in a manner similar to the above-described processing for the case of a handover. For example, in a case where a base station apparatus that provides a primary cell to the terminal apparatus 121 has connected to another new base station apparatus due to a change or addition of a secondary cell, it can notify the terminal apparatus 121 of whether to keep holding pieces of advance setting information related to base station apparatuses which provide cells that act as other secondary cell candidates and which have not been connected. For example, in a case where there are a plurality of cells that act as secondary cell candidates, pieces of advance setting information are prepared respectively for a plurality of other base station apparatuses that respectively provide these plurality of cells. Then, for each of the pieces of advance setting information that respectively correspond to these plurality of other base station apparatuses, a setting can be configured as to whether it is to be deleted at the time of change or addition of a connection-destination secondary cell, and the terminal apparatus 121 can be notified of this setting. Also, this notification indicating whether the pieces of advance setting information are to be deleted can include information indicating which one(s) of the plurality of pieces of advance setting information is to be deleted, or which one(s) of the plurality of pieces of advance setting information is not to be deleted. Furthermore, information corresponding to pieces of advance setting information that are not deleted in the terminal apparatus 121 can be shared among base station apparatuses in accordance with a change and addition of a connection destination of the terminal apparatus 121. For example, in a case where a primary cell has been changed (i.e., a handover has been performed), a base station apparatus that provided the pre-change primary cell can notify a base station apparatus that provides the post-change primary cell of information that can specify pieces of advance setting information that are held in the terminal apparatus 121 without being deleted. This notification can be provide using, for example, a message such as SN STATUS TRANSFER, EARLY STATUS TRANSFER, and RETRIEVE UE CONTEXT RESPONSE. Also, this notification may be provided using a new Xn message. In addition, in a case where a secondary cell has been changed, a base station apparatus that provided the pre-change secondary cell can notify a base station apparatus that provides the post-change secondary cell of information that can specify pieces of advance setting information that are held in the terminal apparatus 121 without being deleted. Note that the base station apparatus that provided the pre-change secondary cell may notify the base station apparatus that provides the post-change secondary cell either directly or via a base station apparatus that provides a primary cell. This notification can be provided using, for example, a message such as UE CONTEXT MODIFICATION RESPONSE, UE CONTEXT RELEASE COMMAND, and UE CONTEXT MODIFICATION REQUEST. Also, this notification may be provided using a new Xn message.

Furthermore, such sharing of information among base station apparatuses may be conducted only in a case where a primary cell has been changed (i.e., a handover has been performed). That is to say, in a case where a primary cell is not changed, a base station apparatus that provides this primary cell holds pieces of advance setting information related to secondary cell candidates. Also, it is the base station apparatus of the primary cell that leads processing for adding and changing a secondary cell, and it is expected that a base station apparatus of the post-change secondary cell need not be aware of pieces of advance setting information that are held in the terminal apparatus 121 without being deleted. On the other hand, in a case where a primary cell has been changed, a base station apparatus of the post-change primary cell needs to be aware of which pieces of advance setting information are held in the terminal apparatus 121 for a later addition and change of a secondary cell. For this reason, information exchange among base station apparatuses may be conducted only in a case where a primary cell has been changed. Note that a normal notification, such as transferring of transmitted data and a notification indicating a frame number, can be naturally provided also at the time of addition and change of a secondary cell. Note that in a case where base station apparatuses that provide secondary cells use information indicating which pieces of advance setting information are held in the terminal apparatus 121, this information may be shared among the base station apparatuses of the secondary cells. In this case, even when a primary cell has not been changed, for example, a base station apparatus that provides a primary cell or a base station apparatus that provides a pre-change secondary cell can notify a base station apparatus that provides a post-change secondary cell of the information related to the pieces of advance setting information.

Furthermore, processing similar to various types of handover-related processing described above can be executed; for example, pieces of advance setting information related to base station apparatuses that provide cells corresponding to a predetermined area to which the terminal apparatus 121 is currently connected are set as pieces of advance setting information to be held. Note that the details of such processing are similar to the above-described processing for the case of a handover, and are therefore not further repeated here.

Note that a conditional change and addition of a secondary cell (Conditional PSC ell Addition/Change) can be started by one of a base station apparatus that provides a primary cell (a master node) and a base station apparatus that provides a secondary cell (a secondary node). In a case where a conditional change and addition of a secondary cell are started by a master node, this master node can issue, to the terminal apparatus 121, an instruction indicating pieces of advance setting information that are to be deleted or not to be deleted. Also, a master node can share information related to pieces of advance setting information that are deleted in the terminal apparatus 121 or maintained without being deleted therein with a secondary node that provides a post-change/addition secondary cell with use of, for example, S-NODE ADDITION REQUEST/S-NODE ADDITION REQUEST ACK or S-NODE MODIFICATION REQUEST/S-NODE MODIFICATION REQUEST ACK. Furthermore, in a case where a conditional change and addition of a secondary cell are started by a secondary node, this secondary node can issue, to the terminal apparatus 121, an instruction indicating pieces of advance setting information that are to be deleted or not to be deleted. Moreover, for example, a pre-change secondary node can share information related to pieces of advance setting information that are deleted in the terminal apparatus 121 or maintained without being deleted therein with a master node with use of, for example, S-NODE MODIFICATION REQUIRED/S-NODE MODIFICATION CONFIRM. Then, the master node can share such information with a post-change secondary node with use of, for example, S-NODE ADDITION REQUEST/S-NODE ADDITION REQUEST ACK.

Furthermore, triggers for deletion of pieces of advance setting information related to secondary cell candidates include an addition and change of a secondary cell and a change of a primary cell (a handover) as stated earlier. Here, in a case where a primary cell has been changed, secondary cell candidates for which corresponding pieces of advance setting information are to be deleted or maintained can be determined in accordance with, for example, which primary cell is a handover target. For example, pieces of advance setting information to be maintained are determined in accordance with usable combinations of a primary cell and a secondary cell. Assume that, in one example, first to third cells have been set as candidates for a handover-target primary cell, and the terminal apparatus 121 holds pieces of advance setting information related to other base station apparatuses that provide them. Also assume that fourth to seventh cells have been set as candidates for a target of addition or change of a secondary cell, and the terminal apparatus 121 holds pieces of advance setting information related to other base station apparatuses that provide them. Here, it is assumed that only the following combinations can be used as combinations of a primary cell and a secondary cell: (first cell, fourth cell), (first cell, sixth cell), (first cell, seventh cell), (second cell, fourth cell), and (third cell, fifth cell). Note that a base station apparatus may notify the terminal apparatus 121 of information indicating these usable combinations of a primary cell and a secondary cell in advance. In this case, when a primary cell has been switched to the first cell, the terminal apparatus 121 cannot use the fifth cell as a secondary cell. Therefore, the terminal apparatus 121 can delete advance setting information related to the fifth cell. Meanwhile, as the fourth cell, the sixth cell, and the seventh cell can be used as a secondary cell, the terminal apparatus 121 can maintain pieces of advance setting information related to these cells without deleting them. Furthermore, in a case where a handover has been performed thereafter from the first cell to the second cell, the sixth cell and the seventh cell cannot be used as a secondary cell; therefore, the terminal apparatus 121 can delete pieces of advance setting information related to these cells, and maintain a piece of advance setting information related to the fourth cell that can be used as a secondary cell. On the other hand, in a case where a handover has been performed from the first cell to the third cell, none of the fourth cell, the sixth cell, and the seventh cell can be used as a secondary cell; therefore, the terminal apparatus 121 can delete all pieces of advance setting information.

Note that the terminal apparatus 121 may be configured to delete all pieces of advance setting information related to secondary cell candidates in a case where a primary cell has been changed to a cell other than the designated cells. In this case, for example, in a case where the terminal apparatus 121 has changed a primary cell to a designated cell, pieces of advance setting information to be maintained without being deleted can be designated in the above-described manner. The terminal apparatus 121 can determine that a handover has been performed to a cell other than the designated cells, for example, in a case where the handover has been performed to a cell for which corresponding advance setting information is not held. The terminal apparatus 121 can delete all pieces of advance setting information related to secondary cell candidates, for example, in a case where it has connected to a base station apparatus that provides a primary cell for which there is no secondary cell that can be used in combination. This is because it is expected that a secondary cell cannot be set during connection to such a primary cell. Furthermore, the terminal apparatus 121 can maintain pieces of advance setting information related to secondary cell candidates in a case where a primary cell has been changed to a designated cell. On the other hand, in a case where the terminal apparatus 121 has changed a primary cell to a cell other than the designated cells, pieces of advance setting information to be maintained without being deleted may be designated in the above-described manner.

Furthermore, for example, in a case where the terminal apparatus 121 executes reconnection processing, a reconnection-destination cell may issue an instruction for deletion of all or a part of pieces of advance setting information related to secondary cell candidates. In this case, the terminal apparatus 121 can hold or delete pieces of advance setting information in accordance with the instruction from the reconnection-destination cell. Also, the terminal apparatus 121 may operate so as to hold pieces of advance setting information when reconnecting to a cell that has been designated in advance, and to delete pieces of advance setting information when reconnecting to a cell that has not been designated in advance.

Note that when connected to a base station apparatus (of a primary cell) or when requested by the base station apparatus, the terminal apparatus 121 can notify this base station apparatus (a network) of capability information (UE Capability) indicating whether pieces of advance setting information that have been held can be maintained at the time of a handover or an addition or change of a secondary cell. The base station apparatus can execute the above-described processing in a case where this capability information indicates that the terminal apparatus 121 can maintain pieces of advance setting information. That is to say, in a case where the base station apparatus has obtained capability information that does not indicate that the terminal apparatus 121 can maintain pieces of advance setting information, the base station apparatus can refrain from executing the above-described processing with respect to this terminal apparatus 121. In this case, the terminal apparatus 121 can delete pieces of advance setting information each time a handover is performed or a secondary cell is added or changed.

According to the above description, the terminal apparatus 121 switches between connection-destination base station apparatuses upon a handover or a change or addition of a secondary cell; however, a procedure similar to the above-described processing can be used also upon a handover to another cell (frequency) of the same base station apparatus or an addition or change of this base station apparatus as a secondary cell. Note that in this case, it can be said that one physical base station apparatus encompasses a plurality of logical base station apparatuses, and these logical base station apparatuses respectively provide individual cells. Therefore, a base station apparatus according to the present embodiment and the attached claims refers to a logical base station apparatus, and "a handover from a base station apparatus to another base station apparatus" and "a change or addition of a secondary cell" also include a handover and a change or addition of a secondary cell inside the same physical base station apparatus. In the present embodiment and the attached claims, "base station apparatus" may be replaced with "cell".

The following describes exemplary configurations of base station apparatuses (base station apparatus 101 to base station apparatus 106) and a terminal apparatus (terminal apparatus 121) that execute the above-described processing, and an example of a flow of the executed processing.

(Apparatus Configuration)

Figure 2:
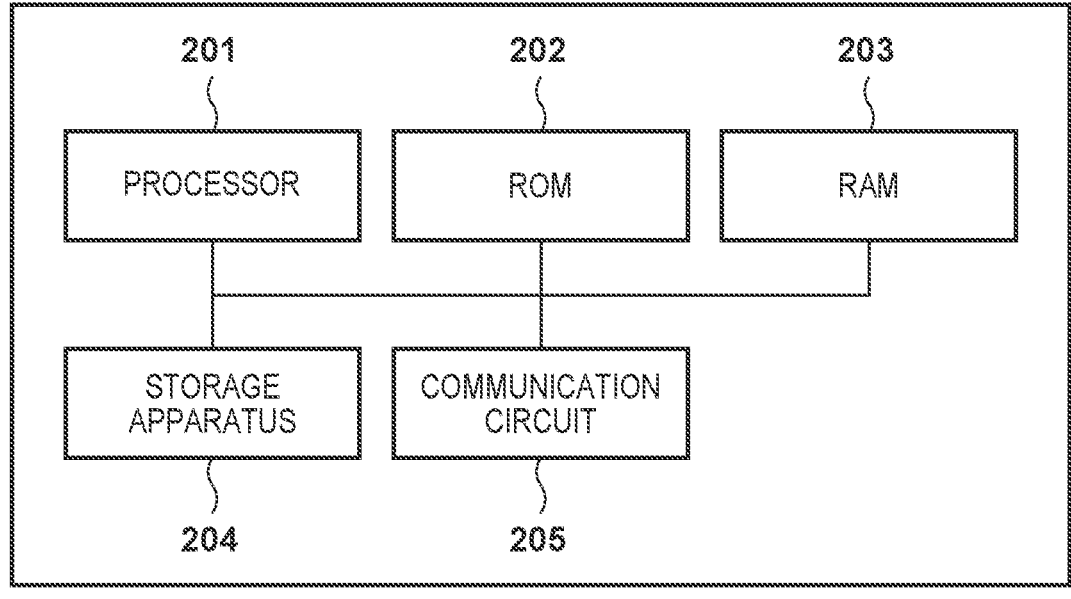
FIG. 2 is a diagram showing an exemplary hardware configuration of a base station apparatus and a terminal apparatus.

An exemplary hardware configuration of the base station apparatuses and the terminal apparatus will be described using FIG. 2. In one example, the base station apparatuses and the terminal apparatus are configured to include a processor 201, a ROM 202, a RAM 203, a storage apparatus 204, and a communication circuit 205. The processor 201 is a computer that is configured to include one or more processing circuits, such as a general-purpose central processing unit (CPU) and an application-specific integrated circuit (ASIC), and executes processing for the entire apparatus and various types of processing described above by reading out a program stored in the ROM 202 or the storage apparatus 204 and executing the program. The ROM 202 is a read-only memory that stores a program related to processing executed by the base station apparatuses and the terminal apparatus, and information of various types of parameters and the like. The RAM 203 is a random-access memory that functions as a working space when the processor 201 executes a program, and also stores temporary information. The storage apparatus 204 is composed of, for example, an attachable/removable external storage apparatus or the like. The communication circuit 205 is composed of, for example, a circuit for radio communication based on LTE or 5G Note that although FIG. 2 shows one communication circuit 205, the base station apparatuses and the terminal apparatus can include a plurality of communication circuits. For example, the base station apparatuses and the terminal apparatus can include radio communication circuits for LTE and 5G; and a shared antenna. Note that the base station apparatuses and the terminal apparatus may include an antenna for LTE and an antenna for 5G that are separate from each other. Also, the base station apparatuses can further include a wired communication circuit that is used in communication with other base station apparatuses and nodes of a core network. Furthermore, the terminal apparatus may include a communication circuit for another radio communication system, such as a wireless LAN. Note that the base station apparatuses and the terminal apparatus may include individual communication circuits 205 that respectively correspond to a plurality of usable frequency bands, or may include a shared communication circuit 205 for at least a part of these frequency bands.

FIG. 3 shows an exemplary functional configuration of a first base station apparatus, which is a handover-source base station apparatus or a base station apparatus that provides a primary cell that configures a setting for changing or adding a secondary cell. The first base station apparatus includes, as functions thereof, a conditional connection destination change setting unit 301, an information deletion necessity notification unit 302, an information provision unit 303, and an information sharing unit 304, for example. Note that in FIG. 3, only the functions that are particularly related to the present embodiment are illustrated, and the illustration of other various functions that can be included in the first base station apparatus is omitted. For example, the first base station apparatus naturally includes other functions that are generally included in a base station apparatus based on LTE or 5G Also, the functional blocks of FIG. 3 are schematically illustrated; the discrete functional blocks may be realized as an integrated entity, or may be further segmentalized. Furthermore, each function of FIG. 3 may be realized by, for example, the processor 201 executing a program stored in the ROM 202 or the storage apparatus 204, or may be realized by, for example, a processor located inside the communication circuit 205 executing predetermined software. Note that regarding the details of processing executed by each functional unit, the aforementioned details are not described here, and only rough functions thereof will be outlined. Note that the first base station apparatus can also naturally include the functions of a later-described second base station apparatus, which is a handover-target base station apparatus or a base station apparatus that provides a post-addition or change secondary cell.

The conditional connection destination change setting unit 301 executes setting processing for a conditional handover of the terminal apparatus, or a conditional addition or change of a secondary cell. That is to say, the conditional connection destination change setting unit 301 transmits a handover request (including, for example, information indicating communication parameters that are currently used by the terminal apparatus, and identification information of a conditional handover) to base station apparatuses that act as handover target candidates, and obtains, from these base station apparatuses that act as the candidates, information of communication parameters to be used after a handover to these base station apparatuses that act as the candidates. Also, the conditional connection destination change setting unit 301 transmits a secondary cell addition request (including, for example, information indicating communication parameters that are currently used by the terminal apparatus, and identification information corresponding to a conditional addition or change of a secondary cell) to base station apparatuses that provide cells that act as candidates for a secondary cell to be added or changed, and obtains, from these base station apparatuses that provide the cells that act as the secondary cell candidates, information of communication parameters to be used after adding or changing the cells provided by these base station apparatuses as a secondary cell. Then, the conditional connection destination change setting unit 301 notifies the terminal apparatus of these communication parameters and configures, on the terminal apparatus, an advance setting for a conditional handover or a conditional addition or change of a secondary cell. Note that the conditions under which a handover or an addition or change of a secondary cell is to be executed may be obtained from base station apparatuses that act as candidates for a connection destination attributed to such a handover or addition or change of a secondary cell, or may be determined by the conditional connection destination change setting unit 301.

The information deletion necessity notification unit 302 notifies the terminal apparatus of whether to delete or keep holding pieces of advance setting information that respectively correspond to base station apparatuses that act as candidates for the destination of changed connection set by the conditional connection destination change setting unit 301 after connecting to another base station apparatus different from these base station apparatuses. Whether to delete pieces of advance setting information may be set by a communication provider, or may be determined in accordance with, for example, a rule indicating that pieces of advance setting information of base station apparatuses with small-sized cells are deleted, pieces of advance setting information are deleted in a case where the distance to the current position of the terminal apparatus is equal to or longer than a predetermined distance, and so forth. Note that whether to delete pieces of advance setting information can be determined for each base station apparatus (cell); however, in one example, pieces of advance setting information to be deleted may be designated in accordance with a relationship with a base station apparatus that is the destination of changed connection. For example, the following may be designated among others: while advance setting information of the base station apparatus 104 is deleted in a case where the terminal apparatus 121 has performed a handover or changed a secondary cell from the base station apparatus 101 to the base station apparatus 102, advance setting information of the base station apparatus 104 is not deleted in a case where the terminal apparatus 121 has performed a handover or changed a secondary cell from the base station apparatus 101 to the base station apparatus 105. Also, the information deletion necessity notification unit 302 may, for example, explicitly provide a notification indicating whether the deletion of advance setting information is necessary when notifying the terminal apparatus of the advance setting information, or may, for example, implicitly provide a notification indicating whether the deletion is necessary in accordance with a predetermined rule indicating, for example, that advance setting information is not deleted in a case where the value of identification information corresponding to the advance setting information is included in a predetermined range.

In a case where the terminal apparatus has executed a conditional handover or a conditional addition or change of a secondary cell after being notified that one or more pieces of advance setting information are to be continuously held, the information provision unit 303 provides a base station apparatus that has been connected upon the handover or the addition or change of the secondary cell with predetermined information which corresponds to such pieces of advance setting information to be continuously held, and which includes at least one of conditions under which the handover or the addition or change of the secondary cell is executed, communication parameters, and pieces of identification information corresponding to such conditions and communication parameters (pieces of advance setting information). Note that the information provision unit 303 provides, among these one or more pieces of advance setting information, a piece(s) of advance setting information related to a base station apparatus(es) different from the base station apparatus that has been connected upon the handover or the addition or change of the secondary cell.

For example, in a case where pieces of advance setting information are shared among a plurality of base station apparatuses which belong to a predetermined area and which include the apparatus of the information sharing unit 304, the information sharing unit 304 provides a piece of advance setting information related to the apparatus of itself, and also obtains pieces of advance setting information from base station apparatuses other than the apparatus of itself among these plurality of base station apparatuses. In this case, the conditional connection destination change setting unit 301 provides the terminal apparatus with the pieces of advance setting information that have been shared (in some cases, excluding the piece of advance setting information of the apparatus of itself). In this case, the condition deletion necessity notification unit 302 can explicitly provide a notification indicating that pieces of advance setting information related to base station apparatuses that belong to the predetermined area are to be deleted when the handover or the addition or change of the secondary cell has been executed beyond the predetermined area. Note that a rule indicating that pieces of advance setting information related to base station apparatuses that belong to the predetermined area are to be deleted when the handover or the addition or change of the secondary cell has been executed beyond the predetermined area, may be defined in advance; in this case, an explicit instruction for deletion may not be transmitted. Note that the information sharing unit 304 may provide a notification indicating that pieces of advance setting information related to base station apparatuses that belong to the predetermined area are to be deleted only when the primary cell has been changed beyond the predetermined area.

FIG. 4 shows an exemplary functional configuration of a second base station apparatus, which is a handover-target base station apparatus or a base station apparatus that provides a post-addition or change secondary cell. The second base station apparatus includes, as functions thereof, an information obtainment unit 401, a connection destination change control unit 402, an information sharing unit 403, and an information deletion unit 404, for example. Note that in FIG. 4, only the functions that are particularly related to the present embodiment are illustrated, and the illustration of other various functions that can be included in the second base station apparatus which is the handover-target base station apparatus or the base station apparatus of the post-addition or change secondary cell is omitted. For example, the second base station apparatus naturally includes other functions that are generally included in a base station apparatus based on LTE or 5G. Also, the functional blocks of FIG. 4 are schematically illustrated; the discrete functional blocks may be realized as an integrated entity, or may be further segmentalized. Furthermore, each function of FIG. 4 may be realized by, for example, the processor 201 executing a program stored in the ROM 202 or the storage apparatus 204, or may be realized by, for example, a processor located inside the communication circuit 205 executing predetermined software. Note that regarding the details of processing executed by each functional unit, the aforementioned details are not described here, and only rough functions thereof will be outlined. Note that the second base station apparatus can also naturally include the functions of the above-described first base station apparatus.

In a case where the terminal apparatus has been handed over to the apparatus of the information obtainment unit 401, or in a case where the terminal apparatus has connected to a cell provided by the apparatus of the information obtainment unit 401 as a post-change or -addition secondary cell, the information obtainment unit 401 obtains, from a base station apparatus from which connection has been changed, predetermined information corresponding to pieces of advance setting information which are to be held in the terminal apparatus and which are intended for a change of a connection destination to another base station apparatus (a handover or an addition or change of a secondary cell). The predetermined information includes at least one of conditions to be satisfied when this change of the connection destination is made, communication parameters to be used after the change of the connection destination, and pieces of identification information corresponding to such conditions and communication parameters. Note that in a case where this predetermined information is not sufficient for the execution of connection destination change control for the terminal apparatus, the information obtainment unit 401 may, for example, obtain additional information for the connection destination change control from a corresponding base station apparatus or the base station apparatus from which connection has been changed based on this predetermined information. Based on the information obtained by the information obtainment unit 401, the connection destination change control unit 402 executes control for a conditional handover or a conditional addition or change of a secondary cell. Note that the connection destination change control unit 402 may re-execute processing for a conditional handover or a conditional addition or change of a secondary cell in order to change the obtained information.

The information sharing unit 403 is similar to the above-described information sharing unit 304. For example, in a case where pieces of advance setting information are shared among a plurality of base station apparatuses which belong to a predetermined area and which include the apparatus of the information sharing unit 403, the information sharing unit 403 provides a piece of advance setting information related to the apparatus of itself, and also obtains pieces of advance setting information from base station apparatuses other than the apparatus of itself among these plurality of base station apparatuses. The information deletion unit 404 deletes, for example, the pieces of advance setting information shared by the information sharing unit 403 when the terminal apparatus has moved to the outside of the predetermined area. Furthermore, the information deletion unit 404 can delete, for example, the information obtained by the information obtainment unit 401 when a connection destination of the terminal apparatus has been changed to another base station apparatus.

FIG. 5 shows an exemplary functional configuration of the terminal apparatus. The terminal apparatus includes, as functions thereof, a connection destination change processing unit 501, an information obtainment unit 502, an information holding unit 503, and a deletion necessity reception unit 504, for example. Note that in FIG. 5, only the functions that are particularly related to the present embodiment are illustrated, and the illustration of other various functions that can be included in the terminal apparatus is omitted. For example, the terminal apparatus naturally includes other functions that are generally included in a terminal apparatus based on LTE or 5G Also, the functional blocks of FIG. 5 are schematically illustrated; the discrete functional blocks may be realized as an integrated entity, or may be further segmentalized. Furthermore, each function of FIG. 5 may be realized by, for example, the processor 201 executing a program stored in the ROM 202 or the storage apparatus 204, or may be realized by, for example, a processor located inside the communication circuit 205 executing predetermined software. Note that regarding the details of processing executed by each functional unit, the aforementioned details are not described here, and only rough functions thereof will be outlined.

The connection destination change processing unit 501 executes setting processing for a conditional handover or a conditional addition or change of a secondary cell with a base station apparatus that is currently connected. For example, the connection destination change processing unit 501 measures a signal from the base station apparatus that is currently connected (and provides, for example, a primary cell or a secondary cell), and transmits the result of this measurement to this base station apparatus (that provides, for example, the primary cell). Then, when this base station apparatus has decided to execute a handover or an addition or change of a secondary cell, the connection destination change processing unit 501 receives a setting message (e.g., an RRC message such as an RRCReconfiguration message) that includes pieces of advance setting information related to base station apparatuses that act as handover target candidates or provide candidates for a secondary cell that acts as a target of addition or change. Then, in a case where the conditions under which a handover is to be executed have been satisfied, the connection destination change processing unit 501 disconnects connection with the base station apparatus that is currently connected, and establishes connection by autonomously executing processing for, for example, establishing time synchronization with a base station apparatus corresponding to such conditions, thereby completing the handover. Furthermore, in a case where the conditions under which an addition or change of a secondary cell is to be executed have been satisfied, if there is a secondary cell that is currently connected, the connection destination change processing unit 501 disconnects connection to a base station apparatus that provides this secondary cell, and establishes connection by autonomously executing processing for, for example, establishing time synchronization with a base station apparatus corresponding to these conditions, thereby completing settings for the secondary cell. The information obtainment unit 502 obtains pieces of advance setting information from the message received by the connection destination change processing unit 501. The information holding unit 503 holds these obtained pieces of advance setting information. The deletion necessity reception unit 504 receives a notification indicating whether the obtained pieces of advance setting information are to be held even after the change of the connection destination attributed to the handover or the addition or change of the secondary cell, or to be deleted after the change of the connection destination. Based on this notification, the information holding unit 503 deletes pieces of advance setting information to be deleted, and keeps holding pieces of advance setting information that are to be continuously held, after the connection destination change processing unit 501 has executed processing for changing the connection destination.

(Flow of Processing)

Next, an example of a flow of processing executed in the radio communication system will be described using FIG. 6 and FIG. 7. Note that as the details of each type of processing described here are as described above, only an outline of processing is described here, and the description of the details thereof is omitted.

It is assumed that, in FIG. 6, initial connection has been established between the terminal apparatus 121 and the base station apparatus 101. In this state, for example, the base station apparatus 101 receives a report on the measurement of the radio quality and the like from the terminal apparatus 121, and accordingly decides to start a preparation for a conditional handover (S601). In accordance with this decision, the base station apparatus 101 transmits a handover request message to other base station apparatuses that act as handover target candidates (the base station apparatus 102, the base station apparatus 104, and the base station apparatus 105) (S602). This handover request message can include, for example, information of communication parameters that are currently used in communication with the terminal apparatus 121, a type of a communication service, and the like. The base station apparatuses that act as the handover target candidates can also determine, for example, whether a communication service equivalent to that before the handover can be provided based on such information of the communication parameters and the like, and reject the handover request in a case where such a communication service cannot be provided. Note, it is assumed that all of the base station apparatuses that act as the candidates accept the handover request in FIG. 6. In this case, the base station apparatuses that act as the candidates can transmit, to the base station apparatus 101, information of communication parameters to be used in a case where the terminal apparatus 121 has been handed over to themselves via a response to the handover request (S603). Note that the base station apparatus 101 can, for example, designate identification information of a conditional handover (i.e., identification information corresponding to advance setting information) and transmit the same using the handover request, and the base station apparatuses that act as the candidates can transmit, to the base station apparatus 101, communication parameters in association with such identification information. Furthermore, the base station apparatus 101 may determine conditions under which the handover is to be executed, and transmit the handover request that also includes such conditions. When such conditions are to be changed, the base station apparatuses that act as the candidates can present the changed conditions to the base station apparatus 101 via the response to the handover request. In addition, the base station apparatus 101 may not determine the conditions under which the handover is to be executed, and the base station apparatuses that act as the candidates may determine such conditions and notify the base station apparatus 101 of the same via the response to the handover request.

The base station apparatus 101 generates a predetermined message (e.g., an RRCReconfiguration message) including pieces of advance setting information based on pieces of information that have been respectively collected from the base station apparatuses that act as the candidates, and transmits the predetermined message to the terminal apparatus 121 (S604). Note that, at this time, the base station apparatus 101 notifies the terminal apparatus 121 of whether each of the pieces of advance setting information that respectively correspond to the base station apparatuses that act as the handover target candidates is to be continuously held or deleted even after the execution of a handover to another base station apparatus. Note that this notification may be transmitted to the terminal apparatus 121 in S604, or may be provided to the terminal apparatus 121 separately therefrom. Note, it is assumed here that a notification has been provided indicating that the pieces of advance setting information of the base station apparatus 102 and the base station apparatus 105 are continuously held, and the piece of advance setting information of the base station apparatus 104 is deleted. When the reception of this predetermined message for a setting has been successful, the terminal apparatus 121 transmits a response message (e.g., an RRCReconfigurationComplete message) to the base station apparatus 101 (S605), and executes an advance setting (S606).

It is assumed that the terminal apparatus 121 has thereafter satisfied conditions for the execution of a handover to the base station apparatus 102 (S607). The terminal apparatus 121 disconnects connection with the base station apparatus 101 that is currently connected (not shown), and executes connection processing including, for example, establishment of synchronization with the base station apparatus 102 (S608). When the base station apparatus 102 has succeeded in connection to the terminal apparatus 121 and completes the handover, it transmits a notification indicating the successful handover to the base station apparatus 101, which is a handover source (S609). In accordance with this notification indicating the successful handover, the base station apparatus 101 notifies the base station apparatus 102 of a state of a sequence number (S610). Also, in the present embodiment, the base station apparatus 101 transmits, to the base station apparatus 102, information related to pieces of advance setting information which have been set in the terminal apparatus 121 in advance and which are not deleted. Note that this information may be transmitted together with the notification of the information in S610, or may be transmitted separately. The information related to the pieces of advance setting information may be the pieces of advance setting information per se, but can be, for example, predetermined information including at least one of handover conditions, communication parameters, and pieces of identification information corresponding to combinations of conditions and communication parameters. Furthermore, the base station apparatus 101 provides the base station apparatus 104, for which a corresponding piece of advance setting information is deleted in the terminal apparatus 121, with a notification indicating that held pieces of advance setting information are to be deleted (S611). This notification can be provided using, for example, a HANDOVER CANCEL message. In addition, the terminal apparatus 121 deletes the piece of advance setting information of the base station apparatus 104 as it has been set to delete this piece of advance setting information upon execution of a handover to a base station apparatus other than the base station apparatus 104 (S612). Moreover, the base station apparatus 101 provides the base station apparatus 104, for which the corresponding piece of advance setting information is held in the terminal apparatus 121, with a notification indicating that the terminal apparatus 121 has been handed over from the base station apparatus 101 to the base station apparatus 102. Consequently, in a case where the terminal apparatus 121 is thereafter handed over from the base station apparatus 102 to the base station apparatus 104, the base station apparatus 104 can notify the base station apparatus 102 of a successful handover.

Figure 7:
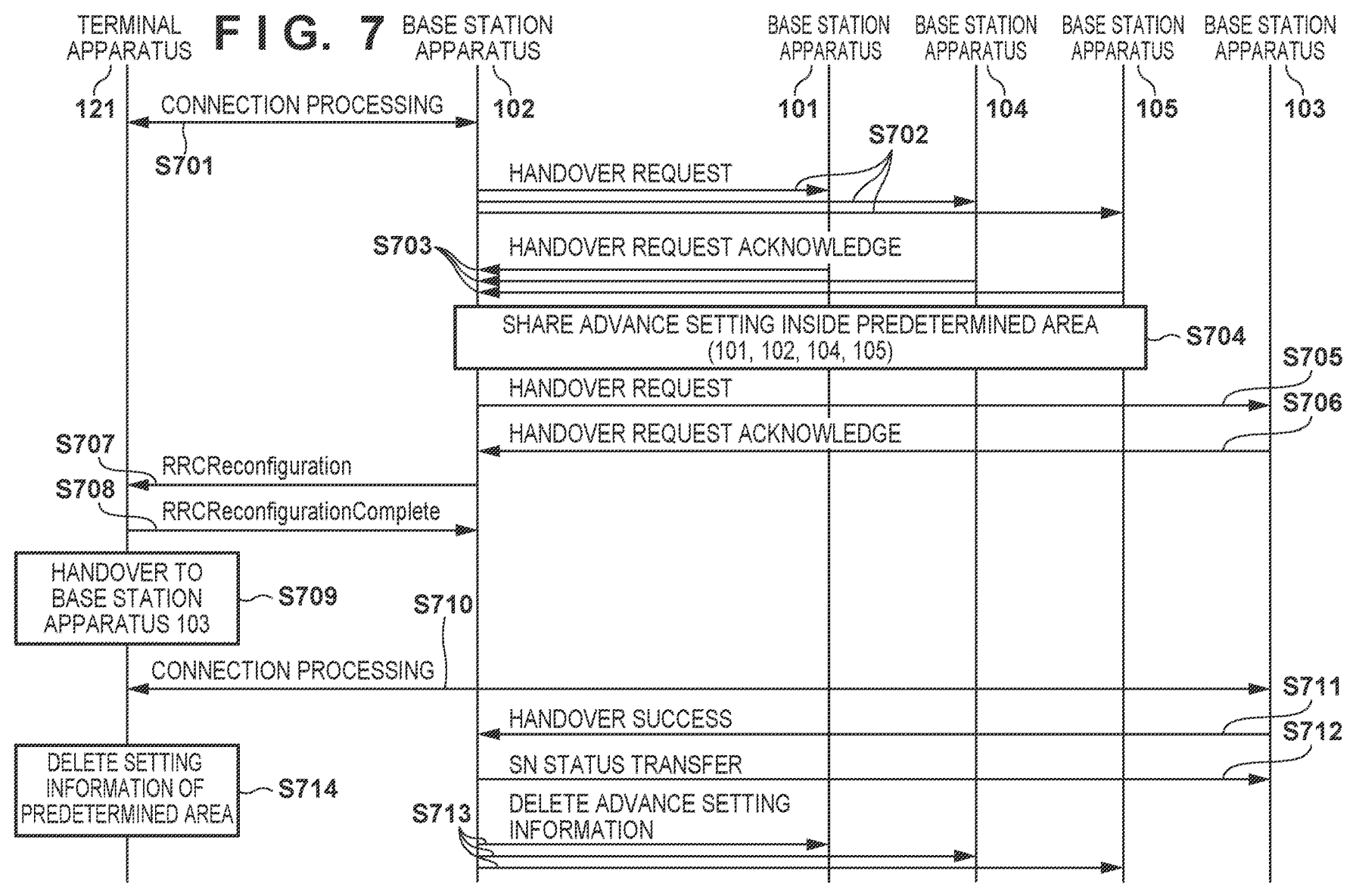

Next, using FIG. 7, a description is given of a flow of processing in which advance setting information is shared in a predetermined area formed by the base station apparatus 101, the base station apparatus 102, the base station apparatus 104, and the base station apparatus 105. In the present processing, first, when the terminal apparatus 121 has connected to the base station apparatus 102 (S701), the base station apparatus 102 starts processing for a conditional handover. Note that this is an example; the base station apparatus 102 may start the processing for the conditional handover in a case where the radio quality of the terminal apparatus 121 has satisfied conditions for starting the processing of the conditional handover. The base station apparatus 102 transmits a handover request for the conditional handover to other base station apparatuses inside the predetermined area (the base station apparatus 101, the base station apparatus 104, and the base station apparatus 105) (S702), and receives a response thereto (S703). Such processing is similar to S602 and S603 of FIG. 6. The base station apparatus 102 notifies each base station apparatus inside the predetermined area of communication parameters to be used in a case where, after the terminal apparatus 121 has been handed over to this base station apparatus, it is handed over to the base station apparatus 102 again (e.g., communication parameters that are currently used), conditions under which the handover is to be executed, and identification information, and provides a piece of advance setting information of itself to other base station apparatuses. It also provides other base station apparatuses with pieces of advance setting information of other base station apparatuses that have been obtained through collection. For example, pieces of advance setting information of the base station apparatus 104 and the base station apparatus 105 are provided to the base station apparatus 101. Note that the piece of advance setting information of the base station apparatus 101 may be provided to the base station apparatus 101. Then, the base station apparatus 102 transmits a message including these shared pieces of advance setting information to the terminal apparatus 121 (S707), and the terminal apparatus 121 holds these pieces of advance setting information and configures an advance setting (not shown). Then, the terminal apparatus 121 transmits a response message to the base station apparatus 102 (S708).

Note that in the present example, it is assumed that the base station apparatus 102 has also configured, on the terminal apparatus 121, a setting for a conditional handover with respect to the base station apparatus 103 outside the predetermined area (S705 to S708). It is also assumed that when, for example, conditions for the handover with respect to the base station apparatus 103 have been satisfied, the terminal apparatus 121 decides to perform the handover to the base station apparatus 103 (S709). Then, in accordance with this decision, the terminal apparatus 121 disconnects connection to the base station apparatus 102 that is currently connected, and executes processing for connection to the base station apparatus 103 (S710). Note that although the above has described a case where the conditional handover is executed as the handover to the base station apparatus 103, no limitation is intended by this. That is to say, for example, when the radio quality of a signal from the base station apparatus 103 has satisfied predetermined conditions, the terminal apparatus 121 may transmit a measurement report to the base station apparatus 102, and handover processing may be executed under control of the base station apparatus 102. Thereafter, the base station apparatus 103 notifies the base station apparatus 102 of the successful handover (S711), and the base station apparatus 102 provides a notification indicating a state of a sequence number (S712). Also, as the terminal apparatus 121 has moved to the outside of the predetermined area, the base station apparatus 102 instructs each base station apparatus inside the predetermined area to delete pieces of advance setting information (S713), and deletes pieces of advance setting information therein (not shown). Furthermore, the terminal apparatus 121 also deletes pieces of advance setting information of the base station apparatus 101, the base station apparatus 102, the base station apparatus 104, and the base station apparatus 105 that belong to the predetermined area (S714).

Figure 8:
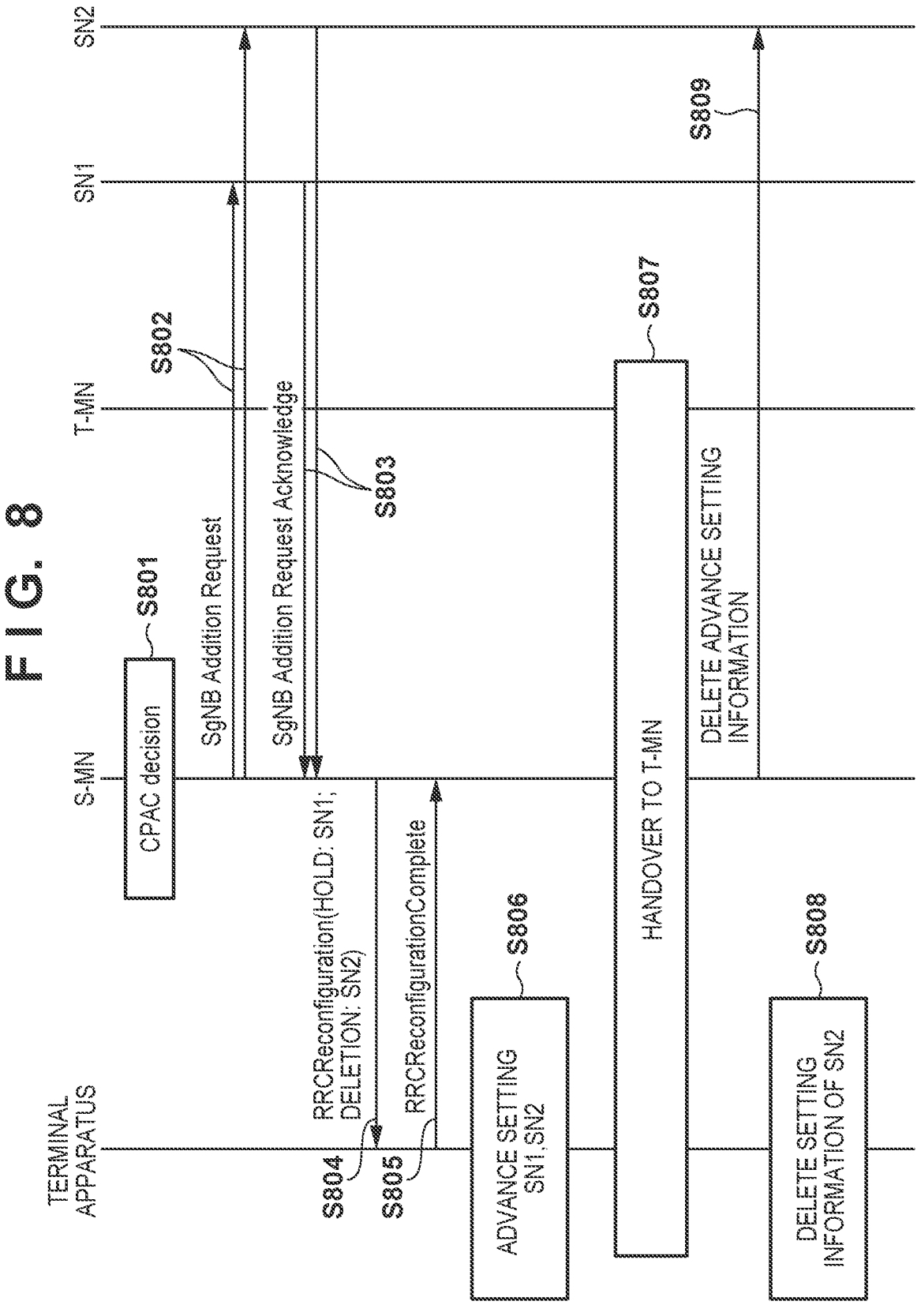
FIG. 8 is a diagram showing an example of a flow of processing executed in the radio communication system.

Next, a flow of processing for handling advance setting information related to a secondary node will be described. FIG. 8 shows a flow of processing for a case where a master node (MN), which is a base station apparatus that provides a primary cell, has been changed. Note that in FIG. 8, MN before switching a connection destination (a handover) is denoted by S-MN (Source MN), and MN after switching the connection destination is denoted by T-MN (Target MN). Furthermore, a base station apparatus that provides a cell that acts as a candidate for a secondary cell to be added or changed is denoted by a secondary node (SN); in FIG. 8, two SNs, namely SN1 and SN2, are illustrated. In the present processing, it is assumed that S-MN has first decided to start a conditional addition and change of a secondary node (CPAC, Conditional PSCell Addition/Change) for setting a secondary cell for the terminal apparatus that is currently connected (S801). S-MN may start this processing, for example, in a case where the radio quality of the terminal apparatus has satisfied conditions for starting processing for CPAC. Note that S-MN can, for example, extract base station apparatuses that provide cells using frequency bands that can be used together with the frequency band used by itself as SN candidates. It is assumed here that S-MN has extracted SN1 and SN2 as base station apparatuses that provide cells that act as secondary cell candidates. S-MN transmits a request message (SgNB Addition Request) for a conditional addition of a secondary cell to SN1 and SN2 (S802), and receives a response thereto (S803). Then, S-MN transmits a message including these shared pieces of advance setting information to the terminal apparatus (S804), and the terminal apparatus transmits a response message to S-MN (S805). Note, it is assumed here that it has been prescribed that the piece of advance setting information of SN1 is to be held even after the execution of a handover or an addition or change of a secondary cell, and it has been designated that the piece of advance setting information of SN2 is to be deleted in a case where a handover or an addition or change of a secondary cell has been executed. Note that this is an example; for example, the configuration may be such that pieces of advance setting information to be deleted and pieces of advance setting information to be maintained vary between a case where a primary cell has been changed (a handover has been performed) and a case where a secondary cell has been added or changed. Then, the terminal apparatus holds these pieces of advance setting information, including the foregoing setting of targets of deletion or maintenance, and configures an advance setting (S806).

It is assumed that the terminal apparatus is thereafter handed over to T-MN by, for example, executing the above-described procedure for the conditional handover, or executing a handover procedure led by S-MN (S807). At this time, on the occurrence of a handover, the terminal apparatus of the present embodiment deletes only pieces of advance setting information to be deleted, and does not delete pieces of advance setting information that are not to be deleted (that are to be maintained) in accordance with the setting of S805. Here, the terminal apparatus deletes the piece of advance setting information of SN2, but on the other hand, maintains the piece of advance setting information of SN1 without deleting the same (S808). Then, the terminal apparatus can execute an addition or change of a secondary cell using, for example, this maintained piece of advance setting information (not shown). Furthermore, S-MN can instruct SN2, for which the corresponding piece of advance setting information has been deleted in the terminal apparatus, to delete the pieces of advance setting information that have been prepared in S802 for this terminal apparatus (S809). In this way, advance setting information for adding and changing a secondary cell can be continuously used after a handover of a primary cell.

Figure 9:
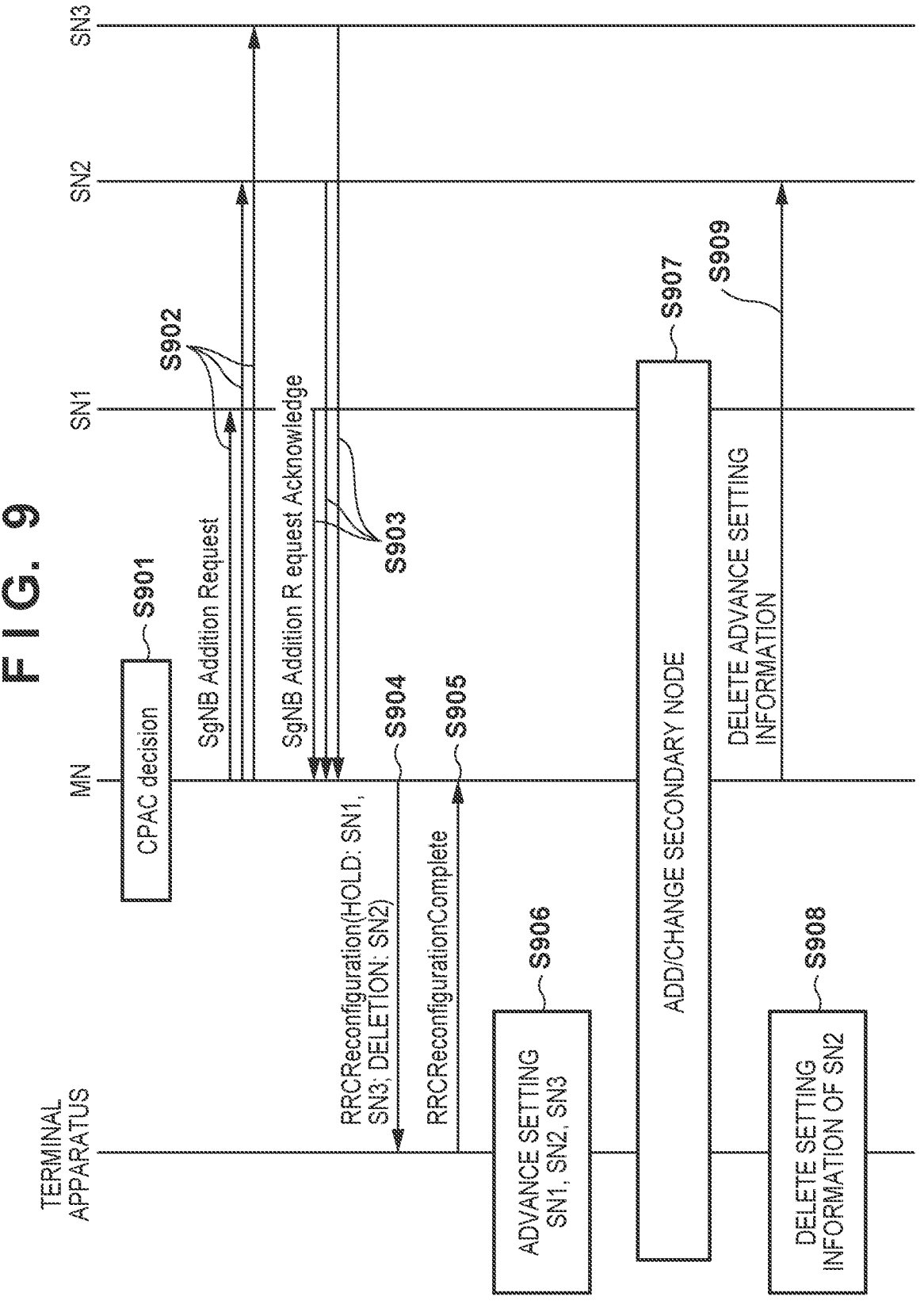
FIG. 9 is a diagram showing an example of a flow of processing executed in the radio communication system.

FIG. 9 shows a flow of processing for a case where SN to which the terminal apparatus is connected has been changed. Processing of S901 to S906 is similar to S801 to S806. Note, it is assumed here that SN1 to SN3 exist as base station apparatuses that provide cells that act as secondary cell candidates, and the terminal apparatus deletes the piece of advance setting information of SN2 but maintains the pieces of advance setting information of SN1 and SN3 without deleting them in a case where a handover or an addition or change of a secondary cell has been executed. It is assumed that the terminal apparatus has thereafter connected to SN1 using the cell provided by SN1 as a secondary cell, for example (S907). In this case, the terminal apparatus deletes only pieces of advance setting information to be deleted, and does not delete pieces of advance setting information that are not to be deleted (that are to be maintained) in accordance with the setting of S905. Here, the terminal apparatus deletes the piece of advance setting information of SN2, but on the other hand, maintains the piece of advance setting information of SN3, which is not the connection destination, without deleting the same (S908). Note that the terminal apparatus naturally does not delete the piece of advance setting information of SN1 because it has been used as setting information of the secondary cell that is currently connected. Thereafter, the terminal apparatus can, for example, execute an addition or change of a secondary cell using these maintained pieces of advance setting information (not shown). Furthermore, MN can instruct SN2, for which the corresponding piece of advance setting information has been deleted in the terminal apparatus, to delete the pieces of advance setting information that have been prepared in S902 for this terminal apparatus (S909). In this way, advance setting information for addition or changing a secondary cell can be continuously used even after a secondary cell has been added or changed.

Note that a part or an entirety of the discrete methods according to the above-described embodiment can be combined with one another when used.

As described above, advance setting information for a conditional handover and a conditional addition or change of a secondary cell can be continuously used even after a connection destination has been changed due to a handover or an addition or change of a secondary cell. In this way, under a circumstance where a handover occurs frequently, the load on advance setting processing for a conditional handover can be alleviated. This makes it possible to contribute to Goal 9 of the Sustainable Development Goals (SDGs) led by the United Nations: "build resilient infrastructure, promote sustainable industrialization, and foster innovation".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A base station apparatus, comprising:
   one or more processors; and
   one or more memories that store a computer-readable instruction for causing, when executed by the one or more processors, the one or more processors to:
   perform notification to a terminal apparatus of whether to delete setting information related to a first another base station apparatus when the terminal apparatus has connected to a second another base station apparatus different from the first another base station apparatus due to a handover or a change or addition of a secondary cell, in a case where the terminal apparatus holds the setting information related to the first another base station apparatus, the setting information including a condition at the time of connection of the terminal apparatus to the first another base station apparatus due to a handover or a change or addition of a secondary cell, and a communication parameter for a case where the terminal apparatus has connected to the first another base station apparatus, the first another base station apparatus providing a cell that acts as a handover target candidate set in advance on the terminal apparatus currently connected to the base station apparatus, or providing a cell that acts as a candidate for a target of addition or change of a secondary cell set in advance on the terminal apparatus currently connected to a cell provided by the base station apparatus as a primary cell.

2. The base station apparatus according to claim 1, wherein
   in a case where the setting information has been set in advance on the terminal apparatus for each of a plurality of the first another base station apparatus, the notification indicates whether each of the pieces of setting information related to the plurality of first another base station apparatuses is to be deleted.

3. The base station apparatus according to claim 1, wherein
   the notification provides an instruction on a piece of setting information to be deleted among pieces of the setting information which have been set in advance on the terminal apparatus and which respectively correspond to one or more of the first another base station apparatus.

4. The base station apparatus according to claim 1, wherein the notification provides an instruction on a piece of setting information that is not to be deleted among pieces of the setting information which have been set in advance on the terminal apparatus and which respectively correspond to one or more of the first another base station apparatus.

5. The base station apparatus according to claim 1, wherein the computer-readable instruction further causes, when executed by the one or more processors, the one or more processors to:

provide, in a case where the terminal apparatus has been provided with a notification indicating that the setting information related to the first another base station apparatus is not to be deleted, the second another base station apparatus with predetermined information related to the first another base station apparatus, the predetermined information including at least one of a condition at the time of connection of the terminal apparatus to the first another base station apparatus due to a handover or a change or addition of a secondary cell, a communication parameter for a case where the terminal apparatus has connected to the first another base station apparatus, and identification information corresponding to a combination of the condition and the communication parameter.

6. The base station apparatus according to claim 5, wherein in a case where the terminal apparatus has been provided with a notification indicating that the setting information related to at least one of two or more of the first another base station apparatus is not to be deleted, the base station apparatus provides the second another base station apparatus with the predetermined information related to the at least one of the two or more of the first another base station apparatus.

7. The base station apparatus according to claim 1, wherein the computer-readable instruction further causes, when executed by the one or more processors, the one or more processors to:

share, with other base station apparatuses that belong to a predetermined area, pieces of the setting information that respectively correspond to the base station apparatus and the other base station apparatuses; and delete the pieces of setting information in a case where the terminal apparatus has connected to an apparatus that belongs to the predetermined area due to a handover or a change or addition of a secondary cell, and deleting the pieces of setting information in a case where the terminal apparatus has connected to an apparatus that does not belong to the predetermined area due to a handover or a change or addition of a secondary cell.

8. The base station apparatus according to claim 7, wherein when the terminal apparatus has been placed in a connected state in the predetermined area, the base station apparatus performs the notification to the terminal apparatus of the pieces of setting information which respectively correspond to the base station apparatus and the other base station apparatuses that belong to the predetermined area, and which have been set to be deleted in a case where the terminal apparatus has moved beyond the predetermined area.

9. The base station apparatus according to claim 7, wherein the predetermined area is an area corresponding to the same tracking area identifier, the same tracking area code, or the same system information area identifier.

10. The base station apparatus according to claim 1, wherein identification information is allocated to pieces of the setting information that respectively correspond to one or more of the first another base station apparatus, and the notification indicates whether each of the first another base station apparatuses is to be deleted using the identification information.

11. The base station apparatus according to claim 10, wherein the identification information is information corresponding to an identifier of a cell formed by the first another base station apparatus.

12. The base station apparatus according to claim 10, wherein in a case where a value indicated by the identification information allocated to the setting information related to the first another base station apparatus is included in a predetermined range, the base station apparatus provides the notification so that the setting information related to the first another base station apparatus is not deleted.

13. The base station apparatus according to claim 1, wherein in a case where a connection destination has been changed due to a handover or a change or addition of a secondary cell, capability information is obtained from the terminal apparatus, the capability information indicating whether the setting information related to a base station apparatus different from a post-change connection destination can be maintained without being deleted, and in a case where the capability information indicates that the terminal apparatus can maintain the setting information related to the base station apparatus different from the post-change connection destination, the base station apparatus performs the notification to the terminal apparatus of whether to delete the setting information related to the first another base station apparatus upon connection to the second another base station apparatus.

14. A terminal apparatus capable of connecting to a first base station apparatus that provides a primary cell and to a second base station apparatus that provides a secondary cell in parallel, the terminal apparatus comprising:

one or more processors; and one or more memories that store a computer-readable instruction for causing, when executed by the one or more processors, the one or more processors to:

hold setting information related to a first another base station apparatus that provides a cell that acts as a candidate for a target of change as the secondary cell, or a candidate to be added as the secondary cell, in a case where the secondary cell is to be changed or the secondary cell is to be added when currently connected to the second base station apparatus, the setting information including a condition at the time of connection of the terminal apparatus to the first another base station apparatus, and a communication parameter for a case where the terminal apparatus has connected to the first another base station apparatus; and receive, from the first base station apparatus, a notification indicating whether the setting information related to the first another base station apparatus is to be deleted in a case where the terminal apparatus has connected to a second another base station apparatus different from the first another base station apparatus and added a cell provided by the second another base station apparatus as the secondary cell, or in a case where the terminal apparatus has changed the secondary cell from another cell, wherein the terminal apparatus holds, rather than deleting, the setting information related to the first another base station apparatus when having connected to the second another base station apparatus, without connecting to the first another base station apparatus, due to an addition or change of the secondary cell in a state where the notification indicates that the setting information related to the first another base station apparatus is not to be deleted, and deletes the setting information related to the first another base station apparatus when having connected to the second another base station apparatus, without connecting to the first another base station apparatus, due to an addition or change of the secondary cell in a state where the notification indicates that the setting information related to the first another base station apparatus is to be deleted.

15. The terminal apparatus according to claim 14, wherein in a case where the setting information has been set in advance on the terminal apparatus for each of a plurality of the first another base station apparatus, the notification indicates whether each of the pieces of setting information related to the plurality of first another base station apparatuses is to be deleted.

16. The terminal apparatus according to claim 14, wherein the notification provides an instruction on a piece of setting information to be deleted among pieces of the setting information which have been set in advance on the terminal apparatus and which respectively correspond to one or more of the first another base station apparatus.

17. The terminal apparatus according to claim 14, wherein the notification provides an instruction on a piece of setting information that is not to be deleted among pieces of the setting information which have been set in advance on the terminal apparatus and which respectively correspond to one or more of the first another base station apparatus.

18. The terminal apparatus according to claim 14, wherein identification information is allocated to pieces of the setting information that respectively correspond to one or more of the first another base station apparatus, and the notification indicates whether each of the first another base station apparatuses is to be deleted using the identification information.

19. The terminal apparatus according to claim 18, wherein the identification information is information corresponding to an identifier of a cell formed by the first another base station apparatus.

20. The terminal apparatus according to claim 14, wherein the computer-readable instruction further causes, when executed by the one or more processors, the one or more processors to:

perform, in a case where a connection-destination base station apparatus has been changed, notification to a base station apparatus that is currently connected of capability information indicating whether the setting information related to a base station apparatus different from a post-change connection destination can be maintained without being deleted.

21. A control method executed by a terminal apparatus capable of connecting to a first base station apparatus that provides a primary cell and to a second base station apparatus that provides a secondary cell in parallel, the control method comprising:

holding setting information related to a first another base station apparatus that provides a cell that acts as a candidate for a target of change as the secondary cell, or a candidate to be added as the secondary cell, in a case where the secondary cell is to be changed or the secondary cell is to be added when currently connected to the second base station apparatus, the setting information including a condition at the time of connection of the terminal apparatus to the first another base station apparatus, and a communication parameter for a case where the terminal apparatus has connected to the first another base station apparatus;

receiving, from the first base station apparatus, a notification indicating whether the setting information related to the first another base station apparatus is to be deleted in a case where the terminal apparatus has connected to a second another base station apparatus different from the first another base station apparatus and added a cell provided by the second another base station apparatus as the secondary cell, or in a case where the terminal apparatus has changed the secondary cell from another cell;

holding, rather than deleting, the setting information related to the first another base station apparatus when having connected to the second another base station apparatus, without connecting to the first another base station apparatus, due to an addition or change of the secondary cell in a state where the notification indicates that the setting information related to the first another base station apparatus is not to be deleted; and deleting the setting information related to the first another base station apparatus when having connected to the second another base station apparatus, without connecting to the first another base station apparatus, due to an addition or change of the secondary cell in a state where the notification indicates that the setting information related to the first another base station apparatus is to be deleted.

22. A non-transitory computer-readable storage medium that stores a program for causing a computer provided in a terminal apparatus to perform the following, the terminal apparatus being capable of connecting to a first base station apparatus that provides a primary cell and to a second base station apparatus that provides a secondary cell in parallel:

hold setting information related to a first another base station apparatus that provides a cell that acts as a candidate for a target of change as the secondary cell, or a candidate to be added as the secondary cell, in a case where the secondary cell is to be changed or the secondary cell is to be added when currently connected to the second base station apparatus, the setting information including a condition at the time of connection of the terminal apparatus to the first another base station apparatus, and a communication parameter for a case where the terminal apparatus has connected to the first another base station apparatus;

receive, from the first base station apparatus, a notification indicating whether the setting information related to the first another base station apparatus is to be deleted in a case where the terminal apparatus has connected to a second another base station apparatus different from the first another base station apparatus and added a cell provided by the second another base station apparatus as the secondary cell, or in a case where the terminal apparatus has changed the secondary cell from another cell;

hold, rather than deleting, the setting information related to the first another base station apparatus when having connected to the second another base station apparatus, without connecting to the first another base station apparatus, due to an addition or change of the secondary cell in a state where the notification indicates that the setting information related to the first another base station apparatus is not to be deleted; and delete the setting information related to the first another base station apparatus when having connected to the second another base station apparatus, without connecting to the first another base station apparatus, due to an addition or change of the secondary cell in a state where the notification indicates that the setting information related to the first another base station apparatus is to be deleted.

\* \* \* \* \*

34